(12) United States Patent
Hayball et al.

(10) Patent No.: US 6,959,335 B1
(45) Date of Patent: Oct. 25, 2005

(54) METHOD OF PROVISIONING A ROUTE IN A CONNECTIONLESS COMMUNICATIONS NETWORK SUCH THAT A GUARANTEED QUALITY OF SERVICE IS PROVIDED

(75) Inventors: Clive C Hayball, Herts (GB); Niall F Ross, Great Dunmow (GB); Gillian Barbara Kendon, Chester (GB); Duncan P Cameron, Germantown, MD (US); Gary R Stoneley, Hertford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/541,185

(22) Filed: Apr. 3, 2000

(30) Foreign Application Priority Data

Dec. 22, 1999 (GB) .................................... 9930428

(51) Int. Cl.[7] .............................................. G06F 15/16
(52) U.S. Cl. ...................................... 709/227; 709/228
(58) Field of Search ............................... 709/235, 227, 709/228; 370/228, 230, 395, 254, 351, 400, 370/235, 321, 352

(56) References Cited

U.S. PATENT DOCUMENTS

| | | | | | |
|---|---|---|---|---|---|
| 4,736,363 | A | * | 4/1988 | Aubin et al. ................. | 370/400 |
| 5,233,604 | A | * | 8/1993 | Ahmadi et al. .............. | 370/238 |
| 5,253,248 | A | * | 10/1993 | Dravida et al. .............. | 370/228 |
| 5,434,848 | A | * | 7/1995 | Chimento et al. ........... | 370/232 |
| 5,751,969 | A | * | 5/1998 | Kapoor ........................ | 709/235 |
| 5,754,543 | A | * | 5/1998 | Seid ............................ | 370/351 |
| 5,815,492 | A | * | 9/1998 | Berthaud et al. ............ | 370/234 |
| 5,995,503 | A | * | 11/1999 | Crawley et al. ............. | 370/351 |
| 6,016,306 | A | * | 1/2000 | Le Boudec et al. ......... | 370/235 |
| 6,178,169 | B1 | * | 1/2001 | Hodgkinson et al. ... | 370/395.52 |
| 6,256,295 | B1 | * | 7/2001 | Callon ......................... | 370/254 |
| 6,256,309 | B1 | * | 7/2001 | Daley et al. ............ | 370/395.43 |
| 6,260,072 | B1 | * | 7/2001 | Rodriguez-Moral ........ | 709/241 |
| 6,415,313 | B1 | * | 7/2002 | Yamada et al. ............. | 709/200 |
| 6,430,154 | B1 | * | 8/2002 | Hunt et al. ............... | 370/230.1 |
| 6,442,147 | B1 | * | 8/2002 | Mauger et al. ............. | 370/321 |
| 6,480,495 | B1 | * | 11/2002 | Mauger et al. ........ | 370/395.65 |
| 6,488,647 | B1 | * | 12/2002 | Miura et al. .................. | 604/29 |
| 6,529,499 | B1 | * | 3/2003 | Doshi et al. ................. | 370/352 |
| 6,594,277 | B1 | * | 7/2003 | Chiang et al. .............. | 370/465 |
| 6,609,002 | B1 | * | 8/2003 | Krishnamurthy et al. ... | 455/428 |
| 6,633,544 | B1 | * | 10/2003 | Rexford et al. ............. | 370/238 |
| 6,657,960 | B1 | * | 12/2003 | Jeffries et al. ........... | 370/230.1 |
| 6,718,380 | B1 | * | 4/2004 | Mohaban et al. ........... | 709/223 |
| 6,744,767 | B1 | * | 6/2004 | Chiu et al. ............. | 370/395.21 |
| 2002/0093957 | A1 | * | 7/2002 | Yazaki et al. ................ | 370/389 |

* cited by examiner

*Primary Examiner*—Ayaz Sheikh
*Assistant Examiner*—Christian La Forgia
(74) *Attorney, Agent, or Firm*—Barnes & Thornburg LLP

(57) ABSTRACT

Leased lines are provisioned over an internet protocol communications network by providing bandwidth tallies at each node and link in the network. Traffic to be sent over the leased line is labelled as high priority at the entry point to the leased line. Differentiated services mechanisms are set up at each node in the route to allow high priority traffic on the leased line to be processed before other traffic. A customer requests a leased line between two points and with a specified bandwidth and quality of service. Bandwidth tallies are checked along the chosen path to ensure that the requested bandwidth is available. As well as this checks are made to ensure that no more than a threshold level of high priority traffic will be present at any one node or link. Once the network is configured such that sufficient bandwidth is available and high priority traffic levels will not exceed the threshold level, the leased line is available for use.

27 Claims, 29 Drawing Sheets

Fig. 15

```
                                                          Flow
0.0010   t 286 215 230 166 14000.0
0.0010   t 240 217 230 166 50000.0
0.0010   t 199 216 230 166 50000.0
0.110375 t 286 215 230 166 14000.0
0.110375 f 286 215 230 166 14000.0
0.111375 t 230 166 185 116 14000.0
0.21975  t 286 215 230 166 14000.0
0.21975  f 286 215 230 166 14000.0
0.22075  t 230 166 185 116 14000.0
0.22075  f 230 166 185 116 14000.0
0.22175  t 185 116 136  69 14000.0
0.329125 t 286 215 230 166 14000.0
0.329125 f 286 215 230 166 14000.0
0.330125 t 230 166 185 116 14000.0
0.330125 f 230 166 185 116 14000.0
0.331125 t 185 116 136  69 14000.0
0.331125 f 185 116 136  69 14000.0
0.332125 t 136  69  77  70 14000.0
0.391625 t 199 216 230 166 50000.0
0.391625 f 199 216 230 166 50000.0
0.391625 t 240 217 230 166 50000.0
0.391625 f 240 217 230 166 50000.0
0.4385   t 286 215 230 166 14000.0
0.4385   f 286 215 230 166 14000.0
0.4395   t 230 166 185 116 14000.0
0.4395   f 230 166 185 116 14000.0
0.4405   t 185 116 136  69 14000.0
0.4405   f 185 116 136  69 14000.0
0.4415   t 136  69  77  70 14000.0
0.4415   f 136  69  77  70 14000.0
0.4425   t  77  70  77 159 14000.0
```

*Fig. 24*

METHOD OF PROVISIONING A ROUTE IN A CONNECTIONLESS COMMUNICATIONS NETWORK SUCH THAT A GUARANTEED QUALITY OF SERVICE IS PROVIDED

BACKGROUND OF THE INVENTION

1. Field of the Invention

This invention relates to a method of provisioning a route in a connectionless communications network such that a guaranteed quality of service is provided. The invention is particularly related to, but in no way limited to, a method of provisioning a leased line in an internet protocol communications network.

2. Description of the Prior Art

A leased line is a route in a communications network between two points which are usually access points to the communications network or alternatively terminals or any other network nodes. The line is provided for use by a customer under a contract such as a service level agreement (SLA) under which the network operator agrees to provide use of the line with a guaranteed quality of service and bandwidth. A customer such as a company or enterprise may have two sites and wish to communicate between these two sites quickly and with a guaranteed quality of service. In this case, the customer can arrange with a network provider to have a leased line between those two sites. Such leased lines have been provided using switched or provisioned connections across connection oriented networks such as TDM (time division multiplex), ATM (asynchronous transfer mode) and Frame Relay networks. These types of communications networks are suitable for providing leased lines because it is relatively easy to set up a specific route across the network which has a guaranteed bandwidth and quality of service. In contrast, internet protocol communications networks are inherently connectionless and it is not straight forward to provide guaranteed quality of service and bandwidth over a specific route as is required for a leased line. For example, a packet routed over an internet protocol communications network is not routed over a pre-specified path but rather its actual path over the network will vary depending on particular network conditions at the time. However, with the advent of internet protocol communications networks such as the internet it is required to provide leased lines over internet protocol communications networks.

The IETF has defined mechanisms such as Differentiated Services (DiffServ) in order to address the challenge of connectionless internet protocol networks. However, Differentiated Services alone do not allow a specified quality of service to be guaranteed.

Multi-protocol label switching (MPLS) is currently being developed by the IETF in order to allow traffic routes in internet protocol communications networks to be pre-specified such that traffic may be routed over or "pinned to" specified paths. However, MPLS does not fully address the problem of providing guaranteed quality of service using an internet protocol communications network. In the same way, tag switching, which has been implemented to "pin" traffic routes, does not fully allow guaranteed levels of quality of service to be provided.

Service providers such as Internet Service Providers (ISPs) and other communications service providers are faced with increasing management problems as use of their services becomes more popular. Service level agreements (SLAs) are typically drawn up between a customer such as an enterprise, and a service provider and these SLAs set out the definitions of the service that the provider agrees to give. SLAs are traditionally paper contracts which list conditions such as quality of service levels and time periods over which services are to be provided, as well as detailing penalties which apply in the event that the agreed service levels are not met. These conditions are typically complex and detailed. Such SLAs arise in many situations, for example, between an access network provider and a service provider, between a service provider and a network provider and between two service providers. Also, a given service provider will have many SLAs for different customers and indeed may have many SLAs for each customer. The SLAs contain valuable information which is essential to the service provider or network operator for good network management and service management. However, obtaining this information quickly in a useable form is a difficult task.

Service providers also seek to provide differentiated services such as premium rate services and best effort services. In order to do this the service provider typically defines specifications for particular classes of service. By providing different classes of service a provider is able to promote greater use of its services whilst at the same time providing more choice for customers. However, once different classes of service are created, the management task for the service provider is increased in complexity.

Many service providers currently capture their SLAs and class of service specifications in documents created using standard word processing tools. However, this approach does not facilitate quick retrieval of information from the SLA and class of service documents in useable forms.

Two products, CrossKeys Resolve Si (trade mark) network performance and monitoring software and Hewlett-Packard's Firehunter (trade mark) network service performance monitoring software have sought to capture SLA related information but are limited in several respects as described below.

CrossKeys Resolve Si (trade mark) software seeks to help service providers to manage service performance. Network information is correlated with customer information and quality of service objectives. The software aims to help service providers to ensure that they are delivering high value services that match the needs of customers. Data is retrieved from each end point and link that together make up a delivered service, allowing reports to be generated that illustrate performance issues. In this way the Resolve software helps service providers to compare the service they are providing against those specified in service level agreements. A server is provided which maintains a service level management object model and client workstations run programs termed "Resolve reporter" and "Resolve Configuration" (trade marks). The Reporter software generates pre-configured reports for customers or for the service provider which present information about how the service performance compares with the conditions set out in service level agreements. The reports are distributed by email, by file, on screen or in print. The Resolve Configurator software is a tool for system administrators to control customer, service and contract data. Using this software system administrators are able to create SLAs.

CrossKeys Resolve Si software focuses specifically on fault and performance monitoring. For example, service providers can set up early warnings of SLA violations by using multiple thresholds for Quality of Service (QoS) parameters. If a service is deteriorating, Resolve warns the service provider of impending problems before they impact. Hewlett-Packard's Firehunter (trade mark) software product also provides some capability to capture SLA related information. Firehunter is designed to monitor and report on the delivered quality of Internet services and provides alarms to warn of potential service level agreement violations before they occur. Firehunter software also generates reports that illustrate performance issues for customers.

Both the CrossKeys Resolve software and Hewlett-Packard Firehunter software products are limited in that they do not have the capability to reason over the information presented to them, not meaningfully relate the service requirements from SLAs to the underlying service configuration.

It is accordingly an object of the present invention to provide a method of provisioning a route in a connectionless communications network such that a guaranteed quality of service is provided which overcomes or at least mitigates one or more of the problems noted above.

Another object of the present invention to provide a method of managing service information which overcomes or at least mitigates one or more of the problems noted above.

SUMMARY OF THE INVENTION

According to an aspect of the present invention there is provided a method of provisioning a path between two specified nodes in a connectionless communications network such that the path has a specified bandwidth and a guaranteed quality of service is provided over that path, wherein said communications network supports a differentiated service mechanism, said method comprising the steps of:

accessing a model of said connectionless communications network;
  determining a path between the two specified nodes using said model;
  assessing the amount of available bandwidth over said path using said model; and
  producing provisioning information to provision said path using said model.

A corresponding computer system is provided for provisioning a path between two specified nodes in a connectionless communications network such that the path has a specified bandwidth and a guaranteed quality of service, wherein said communications network supports a differentiated service mechanism, said computer system comprising:

a processor arranged to access a model of the connectionless communications network;
  said processor being arranged to determine a path between the two specified nodes using said model;
  wherein said processor is further arranged to assess the amount of available bandwidth over said path using said model; and
  said processor being arranged to use said model to produce provisioning information to provision said path.

A corresponding connectionless communications network is provided comprising a computer system for provisioning a path between two specified nodes in a connectionless communications network such that the path has a specified bandwidth and a guaranteed quality of service, wherein said communications network supports a differentiated service mechanism, said computer system comprising:

a processor arranged to access a model of the connectionless communications network and to determine a path between the two specified nodes using said model;
  wherein said processor is further arranged to assess the amount of available bandwidth over said path using said model; and
  said processor being arranged to use said model to produce provisioning information to provision said path.

A corresponding computer program is provided, stored on a computer readable medium, said computer program being arranged to control a computer system for provisioning a path between two specified nodes in a connectionless communications network, such that the path has a specified bandwidth and a guaranteed quality of service is provided over that path, wherein said communications network supports a differentiated service mechanism, said computer program being arranged to control said computer system such that:

a model of the connectionless communications network is accessed;
  a path between the two specified nodes is determined using said model;
  the amount of available bandwidth over said path is assessed using said model; and
  provisioning information to provision said path is produced using said model.

This provides the advantage that it is possible to provision a path over a connectionless communications network, such as the internet, which has a guaranteed bandwidth and quality of service. By using a combination of a differentiated service mechanism, and assessing the amount of bandwidth available a model of the communications network is used to provide the provisioning information. This enables a network operator to make efficient use of a communications network and to provide differentiated services which promote efficient use of that network. The network operator is provided with a means to manage the communications network easily whilst providing several virtual leased lines and differentiated services which are otherwise complex to manage. In this way the network operator is able to meet service level agreements that are entered into and ensure that specified quality of service levels are met even though connectionless communications networks such as the internet are used.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 15 shows another GUI dialogue box from a service management system.

FIG. 24 is an extract from a flow file output from a discrete event simulator.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

U.S. Pat. Nos. 6,233,610 and 6,349,332 (all assigned to Nortel Networks Corporation or related companies) are related to the present invention and are incorporated herein by reference. These U.S. patents, describe a management system for a communications network where the management system uses a model based approach. That is, a model of a communications network is created and stored in a network management system and used to manage that communications network. Network elements that are to be managed are represented by objects in the model and a key feature involves using separate model representations for the function of a network element and the specific implementation of that network element. By doing this it is possible to easily adapt the model in the situation that a network element such as a switch is replaced by a switch of another manufacturer, but which performs the same basic functions. Whilst these co-pending applications describe communications network management systems which are fully functional and operable, they do not specifically address the problems associated with provisioning leased lines in internet protocol networks.

The term "connectionless communications network" is used to refer to any type of communications network in which a pre-defined connection between two nodes does not need to exist before communications may be sent between those nodes. Examples of connectionless communications networks include internet protocol communications networks.

A leased line in a connectionless communications network is referred to as a "virtual leased line" because the physical connections over which such a leased line pass may vary as long as a continuous path between two specified nodes is provided. However, the path should meet the conditions such as required bandwidth and quality of service, set down in any contract such as an SLA between an enterprise and a carrier.

Figure 1:
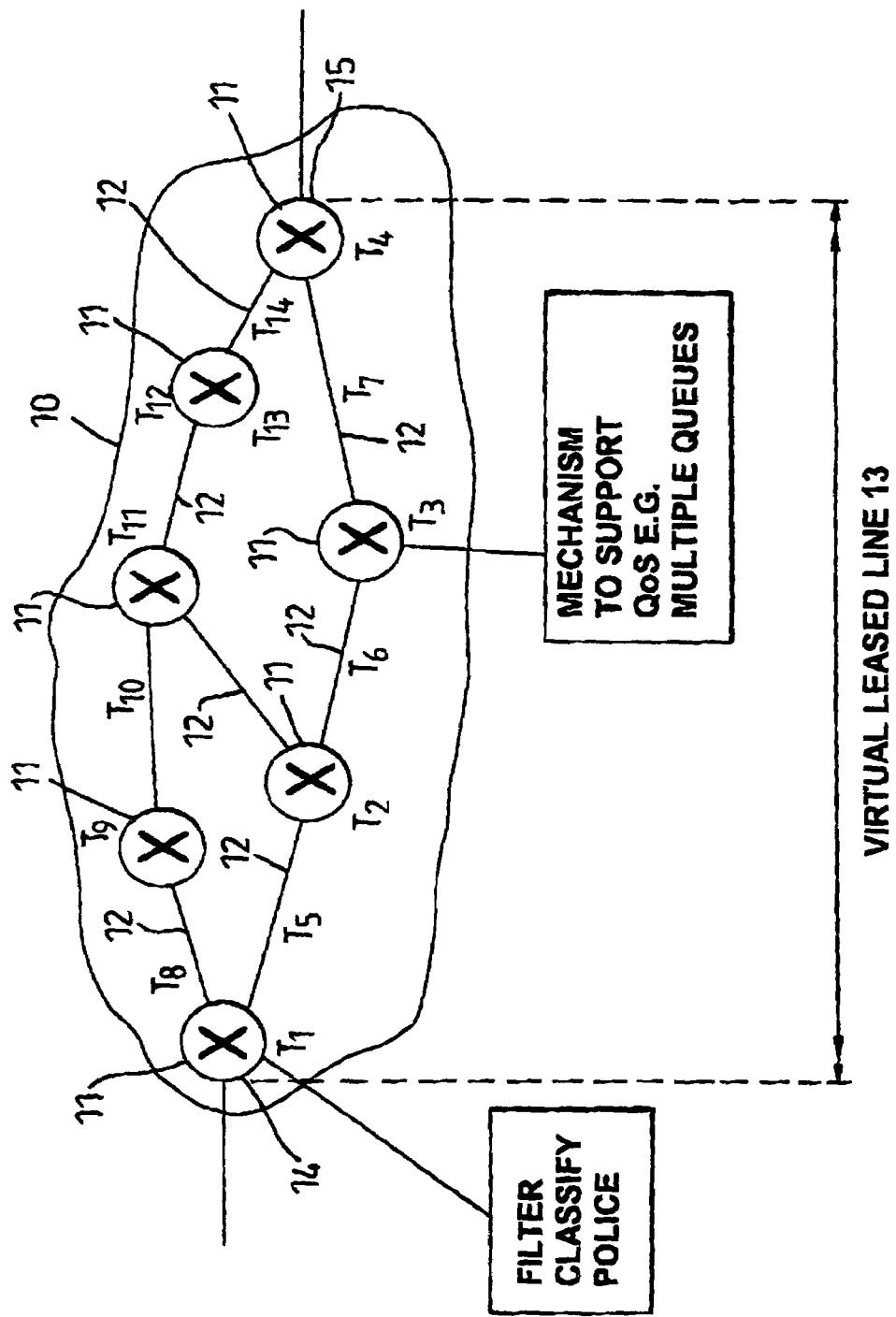
FIG. 1 is a schematic diagram of a connectionless communications network over which a virtual leased line is provided and where differentiated services are provided.

FIG. 1 shows a connectionless communications network 10 such as an internet protocol communications network. This comprises a plurality of nodes such as routers 11 that are interconnected by links 12. The communications network 10 may comprise other nodes and links as well as those illustrated in FIG. 1. A virtual leased line 13 is shown in FIG. 1 between two edge interfaces 14, 15 one of which is an ingress point 14 for the virtual leased line and one an egress point 15 for the virtual leased line. As illustrated in FIG. 1 there are several different paths between the edge interfaces 14, 15. When a service provider or carrier enters into a contract with a customer (or enterprise) to provide a guaranteed bandwidth and quality of service between those two edge interfaces 14, 15, the particular path used may be any of the available paths that meets the required conditions. It is also possible for the path to change during the lifetime of the contract, as long as the required bandwidth and quality of service is provided. This differs from a leased line in a connection oriented communications network where a specified circuit is leased. Because of this the term "virtual leased line" is used when referring to leased lines in connectionless communications networks.

Bandwidth tallies T are maintained by a management system for each node 11 and link 12 in the communications network 10 (see T1 to T14 in FIG. 1). Each bandwidth tally comprises a record of the amount of bandwidth currently available at the respective node or link as well as the amount of bandwidth available in the future, on the basis of reservations. The bandwidth tallies are stored in a management system.

A mechanism for providing a differentiated service is set-up on the communications network 10. A "differentiated service" is one in which traffic is assigned a service type and is treated in a different manner according to its service type. Any suitable type of mechanism may be used. For example, the method of multiple queues or priority queuing is used. Under this method, two or more queues are maintained at each node 11 in the communications network 10 and in the present example two queues are considered (the method of using two queues is known as expedited forwarding). Each queue is for traffic of a particular service type. Thus, in the case where there are two queues, there are two service types. These service types are referred to as "best effort" and "premium rate" where the premium rate level has higher priority than the best effort level. As traffic enters the communications network 10 it is assigned a label indicating which service type that traffic takes. For example, for communications networks such as internet protocol communications networks where the traffic is sent in packets, each packet has a header containing a service type label.

When a packet of premium rate traffic arrives at a node 11 in the communications network 10 it is placed in the queue for premium rate traffic. Similarly, packets of best effort traffic are always placed in the queue for best effort traffic. The node 11 is arranged to always process items from the premium rate queue first. Items from the best effort queue are only processed if no premium rate items are present. In this way the premium rate traffic is processed quickly and quality of service for that premium rate traffic is improved relative to that for the best effort traffic. However, using this queuing method alone does not enable quality of service for the premium rate traffic to be guaranteed. For example, a node in the network may become congested with premium rate traffic.

FIG. 1 indicates that the functions of edge ingress interface 14 include filtering, classifying and policing. The function of classifying involves assigning labels indicating which service levels that traffic takes as it enters the communications network 10. The function of filtering involves restricting access to the communications network or virtual leased line on the basis of SLAs. The function of policing involves monitoring the amount of traffic issuing from particular customers and rejecting or delaying that traffic if agreed service level agreement metrics are violated.

Figure 2:
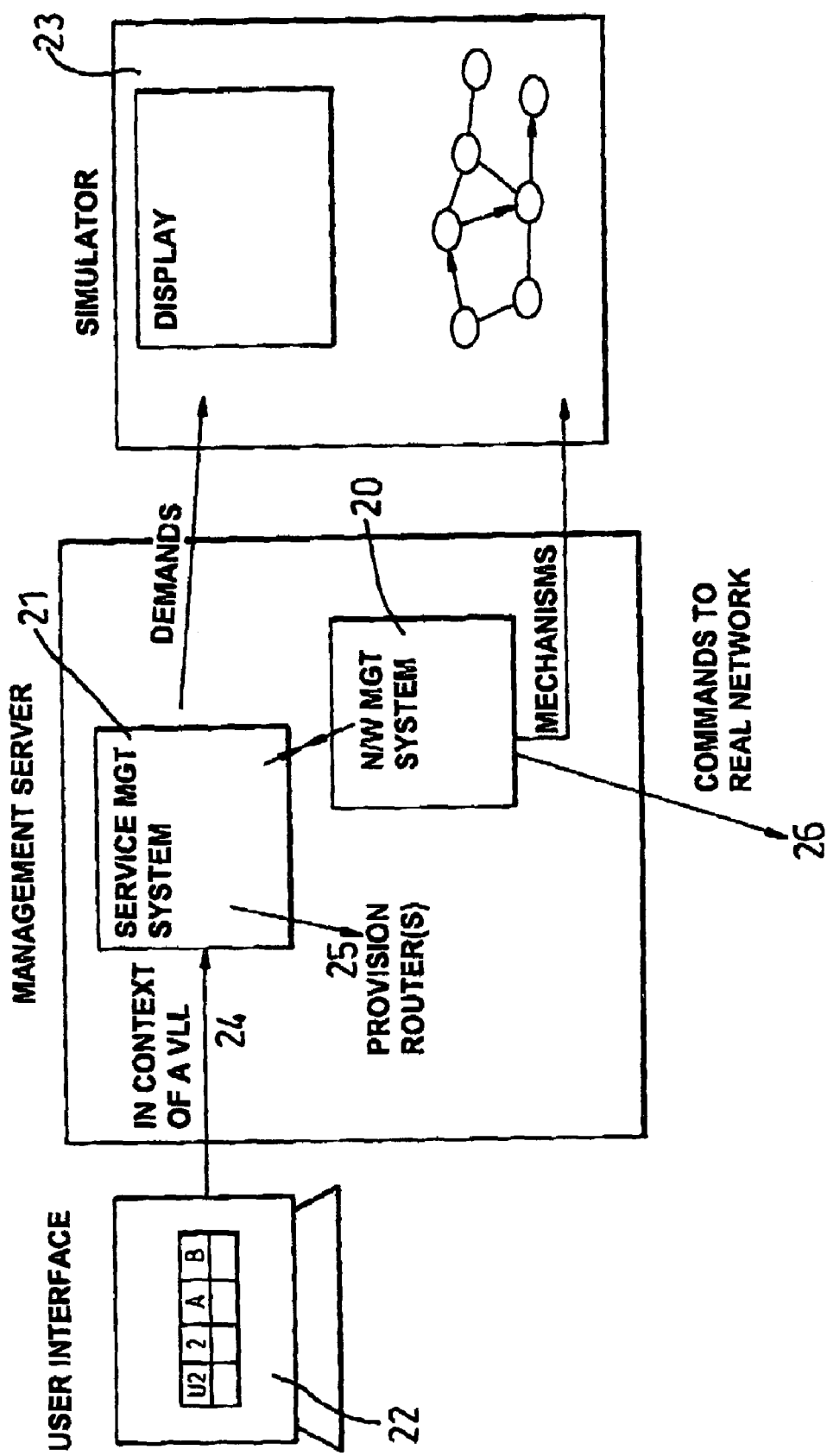
FIG. 2 is a schematic diagram of a service management system, a network management system, a discrete event simulator, a user interface and the relationship between these entities.

FIG. 2 shows a network management system 20, a service management system 21 and the relationship between these and a user interface 22 and simulator 23. The service management system 21 is used by a carrier or network operator to manage a virtual leased line service on a communications network 10 such as that illustrated in FIG. 1. An enterprise or other user is able to request a virtual leased line service from a carrier via an input 24 to the service management system. This request specifies the network nodes between which the virtual leased line service is required and the required bandwidth. An output 25 from the service management system 21 provides details of how to provision the nodes 11 in the communications network being managed, in order to provide the required virtual leased lines.

A network management system 20 is also provided to carry out the task of managing the whole communications network 10 rather than just the parts of that network which are involved in the virtual leased line service. The service management system 21 may be part of the network management system 20 itself, although these items are shown separately in FIG. 2 for clarity. An output 26 from the network management system 20 directs commands to the communications network 10 being managed. The network management system 20 may be any suitable type of network management system such as those described in pending U.S. patent application Ser. Nos. 08/921,208, 08/918,895, 08/921,225, 08/921,649 and 09/124,479. The management system comprises or accesses three models which the service management system and the network management system can access. These models are described in more detail with respect to FIG. 5 below and comprise information about the carrier service types, associated contracts, type of differentiated service mechanism and the topology of the communications network. These models are referred to herein as a carrier service model, a differentiated service model and a network model.

Information from the network management system 20 may be input to a simulator 23 together with information from the service management system 21. For example, this information comprises the topology of the network and information about the available bandwidths at nodes and links. Information about the differentiated service mechanism used is also input together with information about the virtual leased line requirements. The simulator uses this information to carry out a simulation of the communications network to forecast congestion points in the network. Any suitable simulation method may be used. The results of the simulation are displayed graphically on a display. For example, this display shows a graphical representation of the network with congestion points highlighted and with coloured lines to indicate traffic flow along virtual leased lines.

A method of provisioning a virtual leased line over a connectionless communications network is now described. The method is described by way of example and with reference to the communications network of FIG. 1 and the management systems and simulator of FIG. 2. An enterprise first requests a virtual leased line 13 from a carrier or service provider. This request comprises details of two network endpoint nodes or interfaces between which the virtual leased line is required, together with the amount of bandwidth required and the quality of service level required. Details of the request are forwarded to the service management system 25 via an input 24. The service management system next determines a possible route in the communications network 10 between the two endpoint nodes or interfaces.

The route is determined using any suitable method. For example, the route may be manually input by a network operator. Alternatively, a route may be "discovered" by issuing a message from the originating end of the proposed leased line and giving that message a header or label which indicates the required destination. At each node 11 that the message reaches, that node forwards the message using a routing table stored at the node. The message also keeps a record of the nodes that it passes and when it reaches the destination node it contains a list of nodes which in sequence form a path between the two endpoint nodes or interfaces. The route may be discovered in this way either directly, that is, using the communications network 10, or using a model of the network.

Another method of determining a path involves "auto-generating" a path, for example by using a known algorithm such as Shortest Path First (SPF). Any other suitable algorithm may be used to "auto-generate" a path as is known in the art.

It is also possible to use a pre-specified path and then use a protocol such as MPLS to pin the virtual leased line traffic to that path.

Once a path has been determined the next stage involves performing an end to end bandwidth check along that route in order to make sure that there is enough capacity for the requested virtual leased line. This is done using the network model in the network management system which has information about the bandwidth tallies T for each of the nodes and links along the route. If any of the bandwidth tallies indicate insufficient capacity for the requested virtual leased line, then the requested virtual leased line is either rejected or the communications network 10 reconfigured. The end-to-end bandwidth check is carried out by the service management system in conjunction with the network management system. The process of rejecting the requested virtual leased line or of reconfiguring the communications network to create enough bandwidth along the required path is also carried out by the service management system in conjunction with the network management system.

Figure 3:
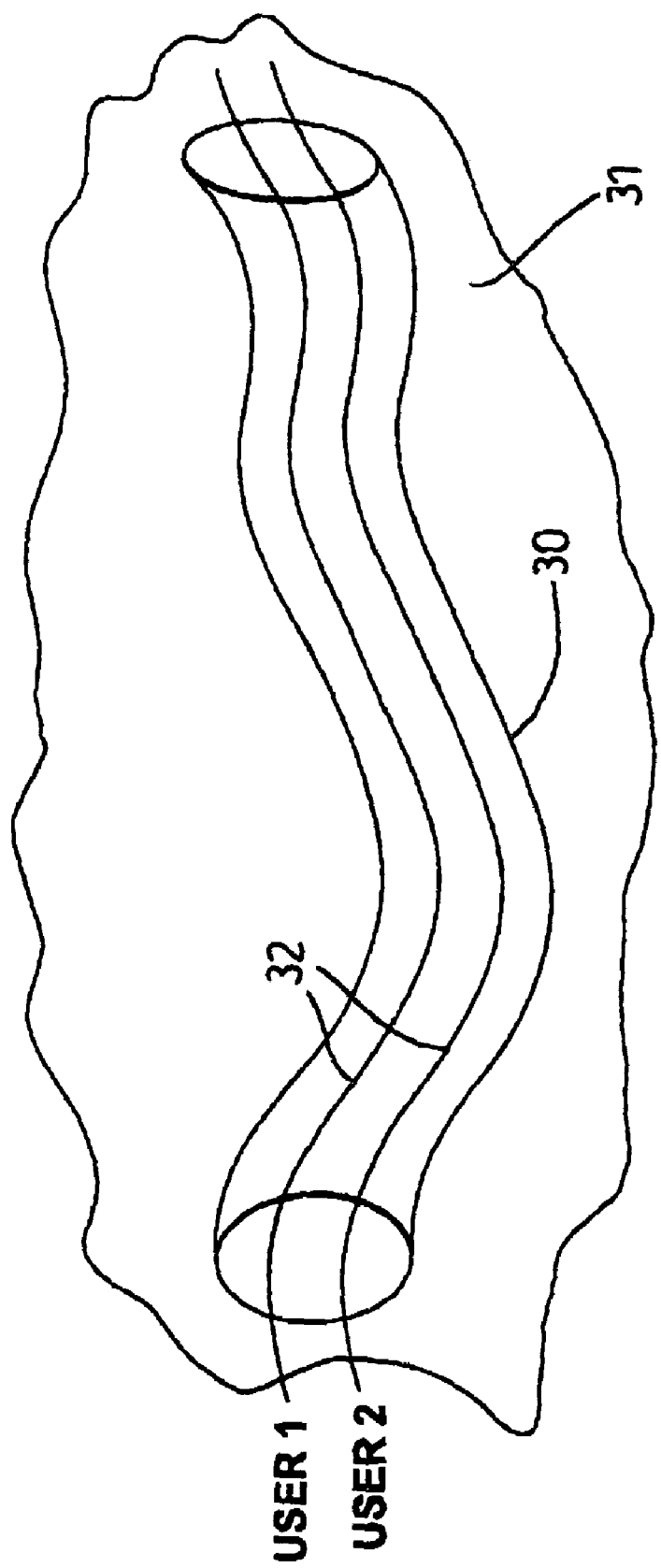
FIG. 3 is a schematic diagram of a connectionless communications network comprising a virtual leased line and constituent user flows.

A differentiated service mechanism is set up over the communications network 10 in advance of provisioning the virtual leased line. For example, in the case that priority queuing is used, these queues are set up at each node and a method of operating the queues implemented at each node. Any suitable differentiated service mechanism may be used. Once the virtual leased line is provisioned the ingress interface at the start point of the virtual leased line path is arranged to filter or classify traffic that reaches it. For example, if the particular differentiated service mechanism involves two service types for traffic, best mode and premium service, then packets of traffic reaching the ingress interface are labelled accordingly, either at that interface or before reaching that interface. For example, the ingress interface may be arranged to forward premium rate traffic along the virtual leased line path and to forward best effort traffic along alternative routes. It is also possible for the virtual leased line to be effectively divided into different portions for use by different users. For example, FIG. 3 is a schematic diagram of a virtual leased line 30 in a communications network 31. The virtual leased line itself is divided into constituent user flows 32 for use by separate users or customers. These constituent user flows 32 are provided under a service level agreement for a specified bandwidth and quality of service, in the same way as for a virtual leased line 30. Using the differentiated service mechanism, traffic travelling over the constituent user flows 32 may be allocated different service types. For example, one of the constituent user flows 32 may take the highest priority traffic and the other traffic of priority intermediate between the highest level and best effort. Any suitable differentiated service mechanism, such as priority queuing may be used.

The communications network 10 may already support one or more virtual leased lines and this affects provisioning of a new virtual leased line. In situations involving a plurality of virtual leased lines over the same communications network contention can arise between the different virtual leased line contracts. Also, if there are large amounts of traffic of one service type using the communications network then traffic of a different service type can be held up for extremely long periods of time. For example, in the case that priority queuing is used, as described above, if there are always items in the high priority queue, the low priority queue never clears. In order to address these problems the network operator may set a threshold level of the proportion of the total bandwidth that may be used at any one node or link for traffic of a particular service type. If this threshold level is less than 100% of the total amount of bandwidth available, then contention and problems with traffic of one service type never being sent are alleviated. The lower the proportion of the total bandwidth that may be used by high priority traffic (for example), the less likely contention and low priority traffic problems are to arise. However, it is not essential to use a threshold level in this way and indeed, for communications networks in which few virtual leased lines are provided, such threshold levels are not required and would simply add to complexity.

In the case that the network operator sets a threshold level for the proportion of available bandwidth at any node or link that may be used for traffic of a particular service type then an end-to-end check is made along the route to ensure that this threshold level is not exceeded. This is done using information about other virtual leased line contracts that are already established as well as information about bandwidth capacities held by the network management system 20. This end-to-end threshold check is carried out by the service management system 21 in conjunction with the network management system 20. The network model is used to make this end-to-end check. If the threshold level is exceeded because the proposed virtual leased line would give too much traffic of one service type at a node or link then the proposed virtual leased line is rejected. In that case, the network may be reconfigured or new equipment added to enable the proposed virtual leased line to be provided. The re- configuration process involves adjusting the network model until a successful end-to-end check is achieved. For example, if the end-to-end check fails because one node in the path has too little bandwidth, then the proposed path for the virtual leased line may be adjusted to use a different node that has more capacity. Once a proposed path for the virtual leased line is determined information about this path is output from the network management system. The provisioning commands or information output from the network management system are either sent directly to the communications network 10 itself or are input to a simulator as described below.

In the situation that the end-to-end threshold check is successful, the details of the proposed virtual leased line are passed from the service and network management systems 20, 21 to a simulator 23. This is an optional step however. Any suitable type of simulator 23 may be used. For example, a discrete event simulator.

The function of the simulator is to model the proposed virtual leased line and run a simulation of how this would operate on the communications network 10 being managed. This enables the behaviour of the actual network to be anticipated ahead of running real traffic. Traffic congestion points and bottlenecks are identified using the simulator. In this case, the communications network 10 is reconfigured to avoid the traffic congestion before the requested virtual leased line is agreed to. Alternatively, the path for the requested virtual leased line is adjusted.

In one example, a discrete event simulator is used. This is implemented using the TeleSim SimKit (trade mark) tool for general purpose discrete-event simulation. However, any suitable discrete event simulation method can be used. Discrete event simulation involves viewing a physical system as a set of independent, interacting, concurrently operating components. For example, using the TeleSim SimKit system, physical processes are represented using Logical Processes which communicate by exchanging messages called Events. Each event is time stamped to indicate when that Event is to occur in a logical process which receives it. Events also carry arbitrary data.

Each logical process has a current simulation time and a process method. An Event is received by a process method as a parameter and that process method executed local state changes that correspond to the simulation Event. Each logical process in a simulation processes Events that it receives in time stamp order. When a logical process sends or schedules an Event, the time-stamp of that Event has to be greater than or equal to the current simulation time of the logical process.

Using the discrete event simulator 23 traffic flows in the communications network 10 are simulated by modelling situations such as the arrival of a packet at a node or router in the network as events. Processes such as forwarding of packets by routers, queues on routers, dropping of packets because of congestion on links and also modelled within the discrete event simulator.

In one embodiment, the inputs to the discrete event simulator 23 include:
- details of the requested virtual leased line from the service management system 21;
- details of the particular differentiated service mechanism used (e.g. priority queuing);
- a threshold level for the proportion of available bandwidth at any node or link that may be used for high priority traffic (such a threshold level is input to the simulator if this threshold value is used in the provisioning method); and
- provisioning data from the network management system such as the topology of the communications network being managed.

The simulator may also be provided with details of a specified path for the proposed virtual leased line. However, this is not essential. The simulator is able to auto-generate such a path using an algorithm such as shortest path first as discussed above.

Other examples of information input to the discrete event simulator include:
- The type of traffic being sent e.g. constant bit rate or variable bit rate traffic.
- The service type of traffic and the inter-packet intervals.
- The start and end times of traffic bursts.
- The queue delays on routers.
- The number of queues on particular routers and information about the background traffic present at particular routers.
- The locations of nodes and the size of links between these as well as the identity of a nearest neighbour for each node.

These inputs are examples only. For example, it is not essential to input information about nearest neighbour nodes because this information could be computed by the simulator if required.

Using the input information, the simulator creates a model of the communications network 10 and simulates the effect of the proposed virtual leased line. In order to do this a model of the background traffic using the network is used. Background traffic is any traffic that is not associated with the virtual leased line in question. For example, this may include low priority traffic and traffic associated with other virtual leased lines. Information about traffic associated with other virtual leased lines is obtained from details of previous service level agreements entered into by the service provided that are still current. By using this information, the additive affect of the proposed new virtual leased line on existing virtual leased lines is assessed.

The simulation involves considering each individual event as packets travel through the network. For example, the output from the simulator 23 comprises a flow file containing a list of events. FIG. 24 shows an extract from a flow file and comprises a list where each row in the list contains information about an event and where the list is in chronological order. The first column of each row shows the time-stamp value for the event and the next column a Boolean value which indicates the direction of travel of the packet for the event concerned. The next four columns give two pairs of x, y co-ordinates indicating node in the network model between which the packet is being sent. The last column gives a figure indicating the size of the packet. Using this flow file the amount of traffic at particular nodes and links at a given time may be calculated and the performance of the network assessed.

Figure 22:
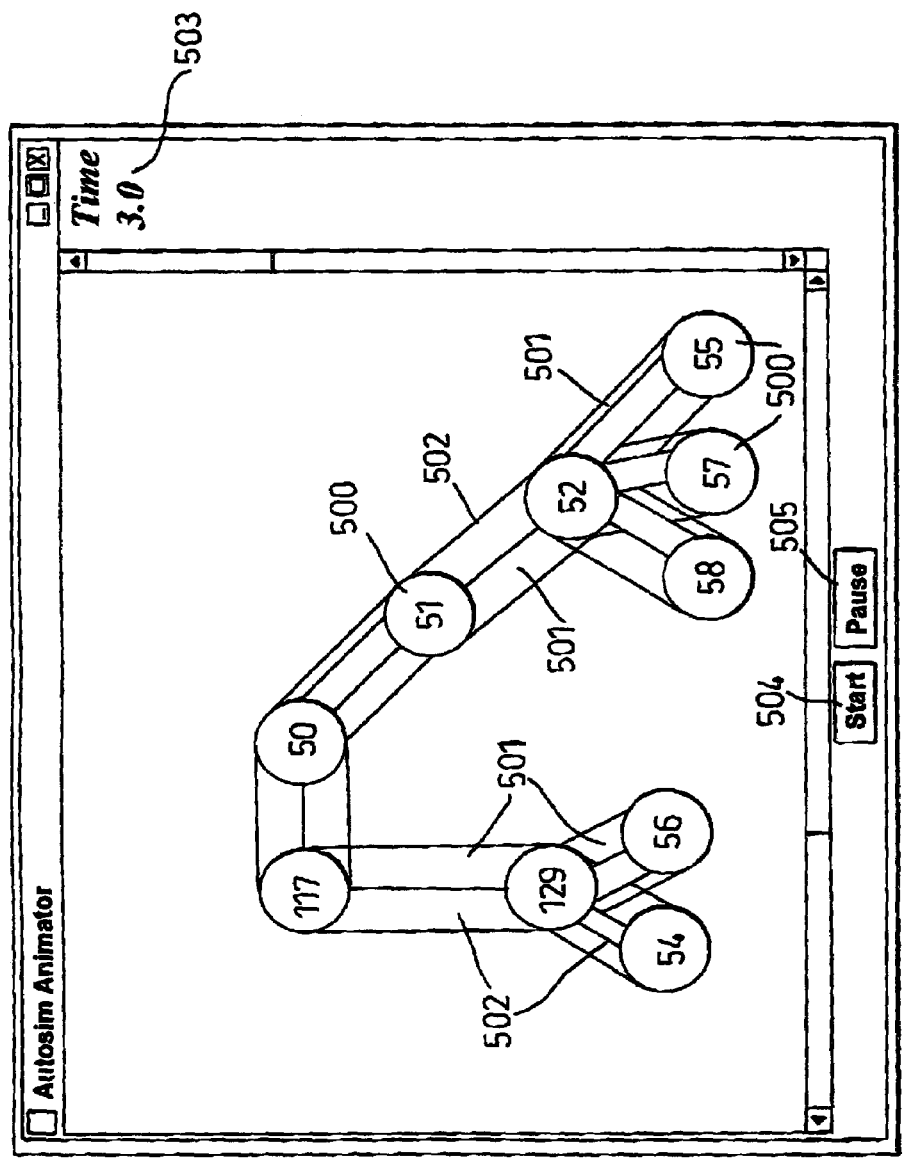
FIG. 22 shows a display of results from a discrete event simulator.
Figure 23:
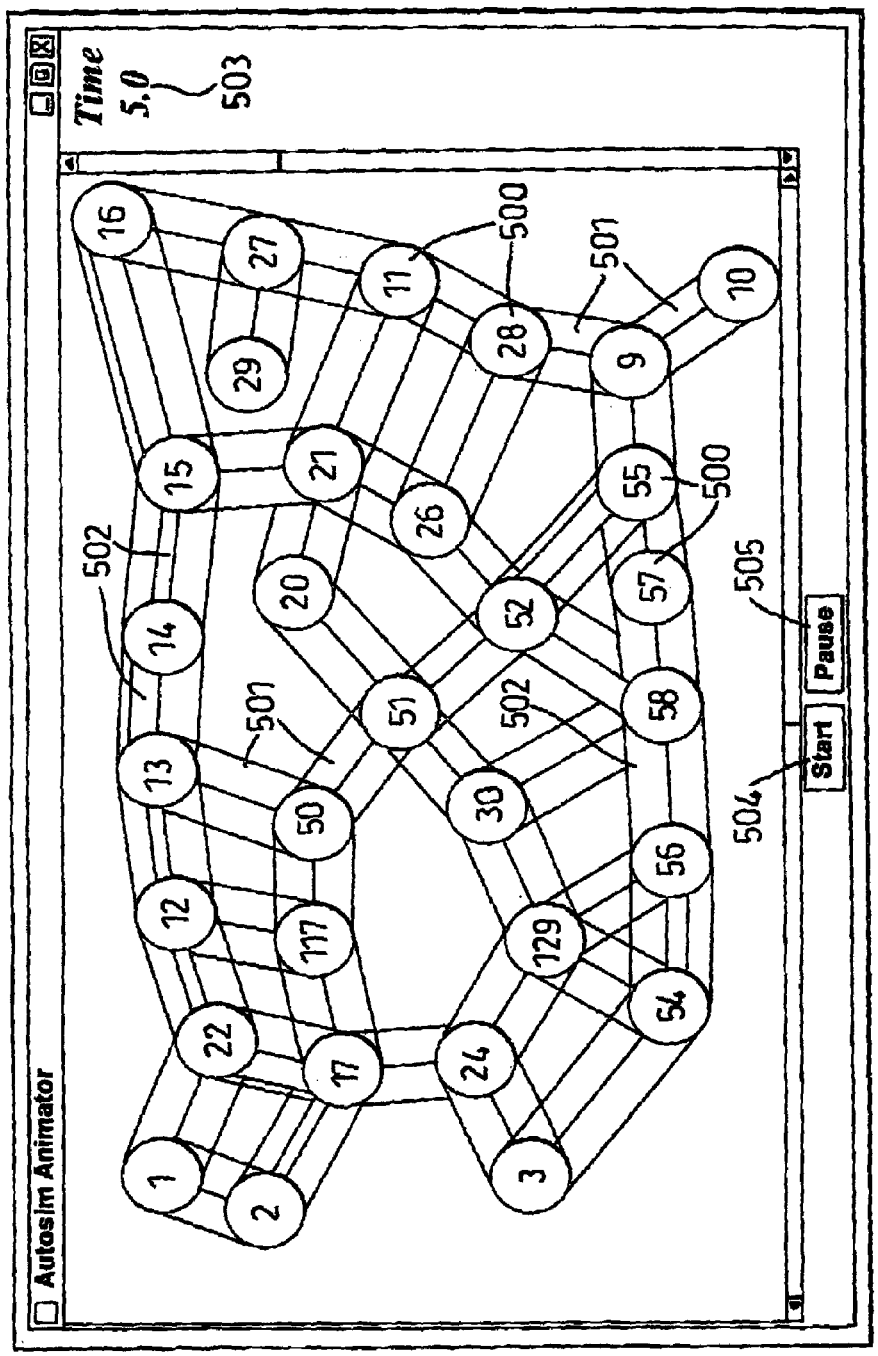
FIG. 23 shows another display of results from a discrete event simulator.

The results of the simulation are also displayed graphically on a display screen as described above with traffic congestion points highlighted. FIGS. 22 and 23 show examples of such displays. For example, FIG. 22 shows a network comprising ten nodes 500 represented as circles containing numbers. The nodes are interconnected by links 501 and the amount of traffic on the links at a particular time is illustrated by shading on the links 501. That is, the wider the shaded area 502 between two links, the more congested that link is with traffic. For example, in FIG. 22 the link between nodes 54 and 129 carries a smaller amount of traffic than the link between nodes 117 and 129. The particular time 503 (in seconds from the start of the simulation) for which these traffic levels are predicted is displayed on the display screen. The user is able to select either a start 504 or a pause button 505 in order to control animation of the display. During animation the shaded areas change with the simulated traffic levels over time. As a result of the simulation the network operator decides whether to re-configure the network, for example, by allocating more resources in the region of predicted congestion points. In the example shown in FIG. 22 the network operator or service provider is presented with a relatively congested network and would then be able to address the problem of congestion before deploying or configuring a real network or service. In contrast, the network of FIG. 23 shows some congested areas and some little used areas.

As described above a differentiated service is enabled on the connectionless communications network 10. This involves arranging the ingress node of a proposed virtual leased line to classify incoming traffic into different service types and to label the traffic accordingly.

Once a simulation has been successfully completed, and the end-to-end checks are successful, then the proposed virtual leased line is effected by the network operator. By using the combination of a differentiated service enabled connectionless communications network and the end-to-end bandwidth checks it is possible to provide a guaranteed quality of service along a route in the network. The addition of the threshold level for the proportion of high priority traffic gives the further advantage of alleviating contention between different virtual leased lines and allowing low priority traffic to flow through the network. As well as this, the use of the discrete event simulator further improves the ability of the network operator to provide a guaranteed quality of service along the route. The network operator is also able to reconfigure the communications network 10 using the results from the discrete event simulator and the network management system. This enables the network operator to deal effectively with requests for virtual leased lines and to make efficient use of the communications network resource.

Figure 4:
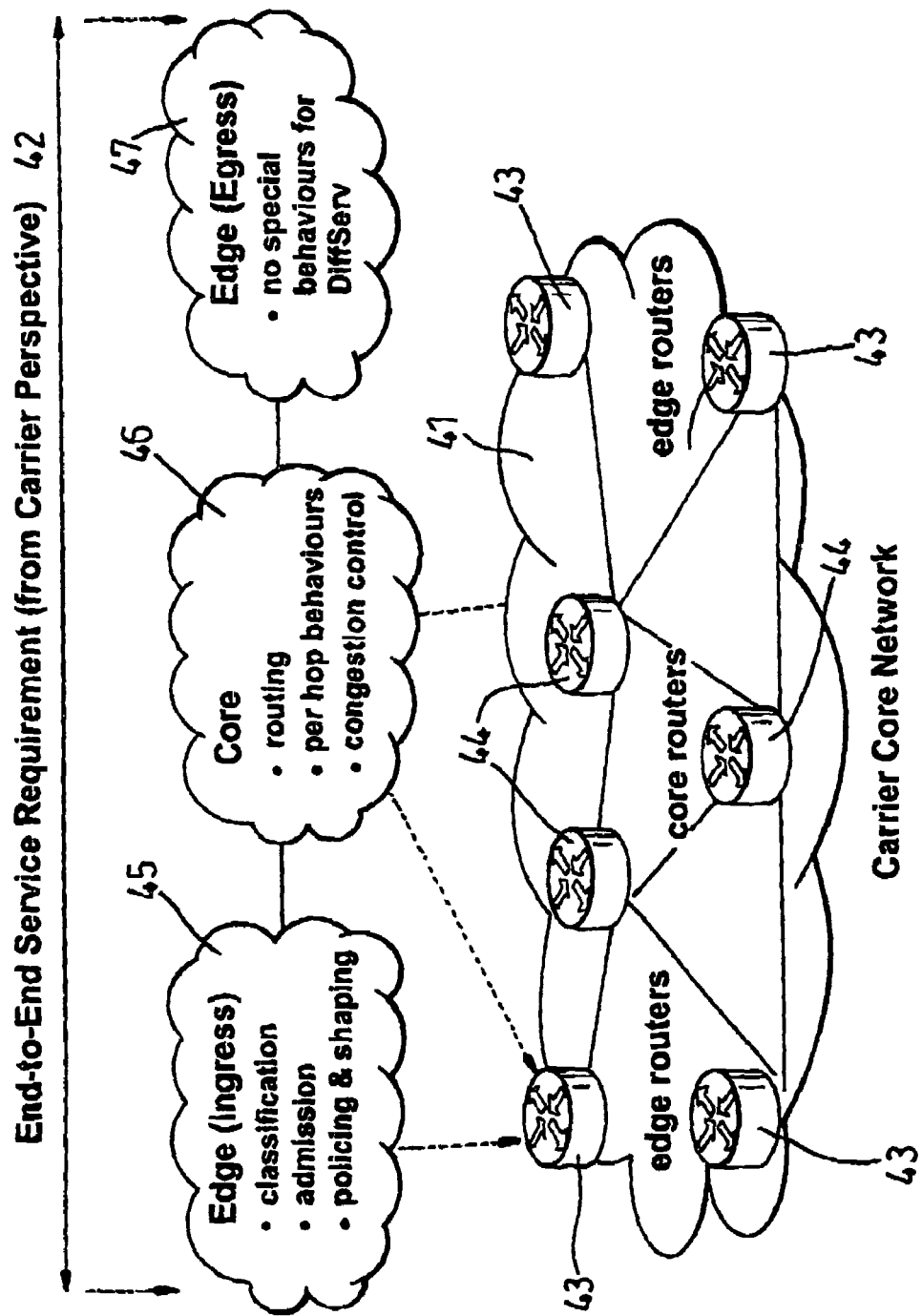
FIG. 4 is a schematic diagram of a communications network 41 such as a carrier core network that is overlaid with differentiated service capabilities and which supports an end-to-end carrier service over a virtual leased line 42.

FIG. 4 shows a communications network 41 such as a carrier core network that is overlaid with differentiated service capabilities and which supports an end-to-end carrier service over a virtual leased line 42. The communications network 41 comprises edge routers 43 which are positioned at access points to the core network 41, and core routers 44 which are located at positions central to the core network 41. The functions of the edge 43 and core 44 routers differs to some extent as illustrated in FIG. 4. Edge routers 43 which act as ingress points for the virtual leased line 42 perform the functions of classifying incoming traffic into different service types, controlling admission to the virtual leased line and policing and shaping traffic patterns entering the virtual leased line (see 45 in FIG. 4). In the event that the virtual leased line is busy, best effort traffic is denied access to the virtual leased line 42 by the ingress edge router or node 43. The function of shaping enforces conformance to preconfigured traffic properties by smoothing burst rates and reallocating buffer space. For example, buffers may be used in order to smooth out bursty data streams.

The core nodes or routers 44 are concerned with routing, per-hop behaviours and congestion control (see 46 in FIG. 4). An example of a per-hop behaviour is scheduling or priority queuing at a router. These core nodes or routers 44 are also involved in congestion control. For example, each core node 44 implements the differentiated service mechanism such as priority queuing which alleviates congestion for high priority traffic. Egress edge nodes or routers 43 perform typical functions of an exit node as is known in the art (see box 47 in FIG. 4).

Figure 5:
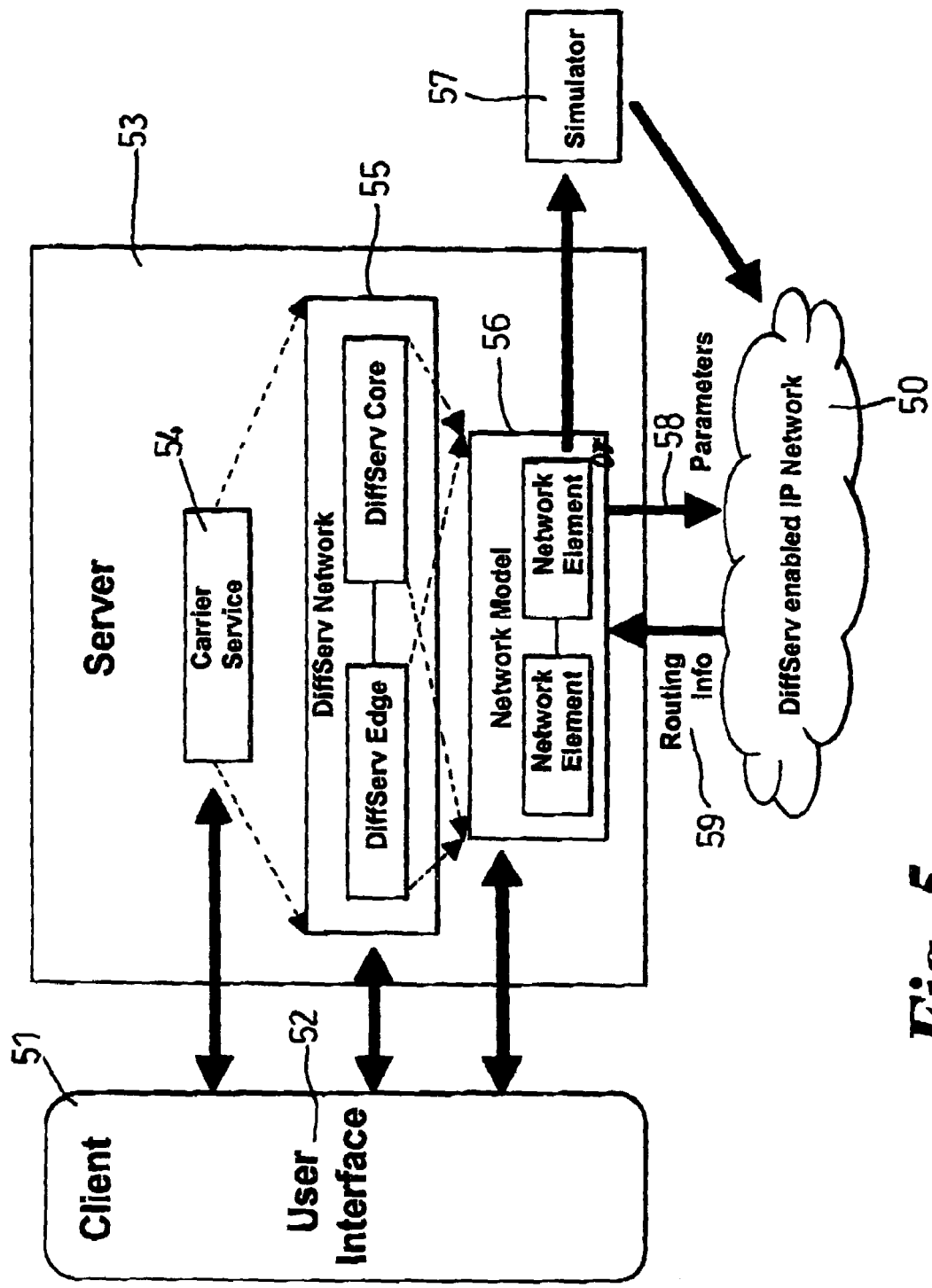
FIG. 5 shows the service management system, network management system, discrete event simulator and user interface of FIG. 2 with greater detail in respect of the service and network management systems.

FIG. 5 illustrates an example of an architecture for a computer system for providing virtual leased lines over a connectionless communications network 50. FIG. 5 shows the example of FIG. 2 with more detail for the management server. A client computer 51 has a user interface 52 with which a network operator is able to interact with a management system 53. The management system 53 comprises three models, a carrier service model 54, a differentiated service model 55 and a network model 56.

Provisioning information determined by the management system 53 is either communicated direct to the communications network 50 or to a simulator 57 as described above. Thus parameters 58 for provisioning the communications network 50 are output from the management system 53 to the communications network 50. Routing information 59 is input to the management system 53 from the communications network 50.

The user interface 52 is, for example, a web-enabled graphical user interface and comprises three functional command categories as described below.

A first command category is network management. This allows the network operator to input information about the communications network 50 being managed. For example, network topology information, router types, internet protocol addresses, interfaces, links, routing decisions and bandwidth information. However, operator input is not essential, the information about the communications network 50 being managed may be derived from the communications network 50 itself. For example, topology information can be derived from an existing network management system or from the network itself. Also, routing decisions can be derived by reading routing tables from actual routers or by running algorithms such as shortest path first off-line.

A second functional command category is service creation. This allows the network operator to enable differentiated services across an internet protocol (or other connectionless) communications network and then to define additional services beyond "best effort". An example of a graphical user interface which allows a service provider or network operator to define services is described below with reference to FIGS. 7 to 15.

A third functional command category is contract management. This allows the network operator to specify and provision for specific contracts, typically derived from service level agreements. Each contract is double-ended i.e. specifies explicit ingress and egress access points and includes an indication of the type of service and bandwidth required and information on how to recognise traffic for this contract.

The management system 53 is implemented on a server and uses object models of:
 the virtual leased line service 54;
 the differentiated service that overlies the connectionless communications network 55; and
 the actual network of routers and links 56.

In order to support the propagation of service and contract specifications onto router behaviours the network management system is arranged to map from a model of the virtual leased line service, to a model of the differentiated service and then finally to a model of the actual network of routers and links. Any suitable method of mapping the models onto each other may be used.

The result behaviours generated by the models on the server are realised by either inputting these to the communications network 50 being managed or inputting these to the simulator 57.

An example of each of the models 54, 55, 56 of FIG. 5 and of a mapping between these models is now described.

Figure 25:
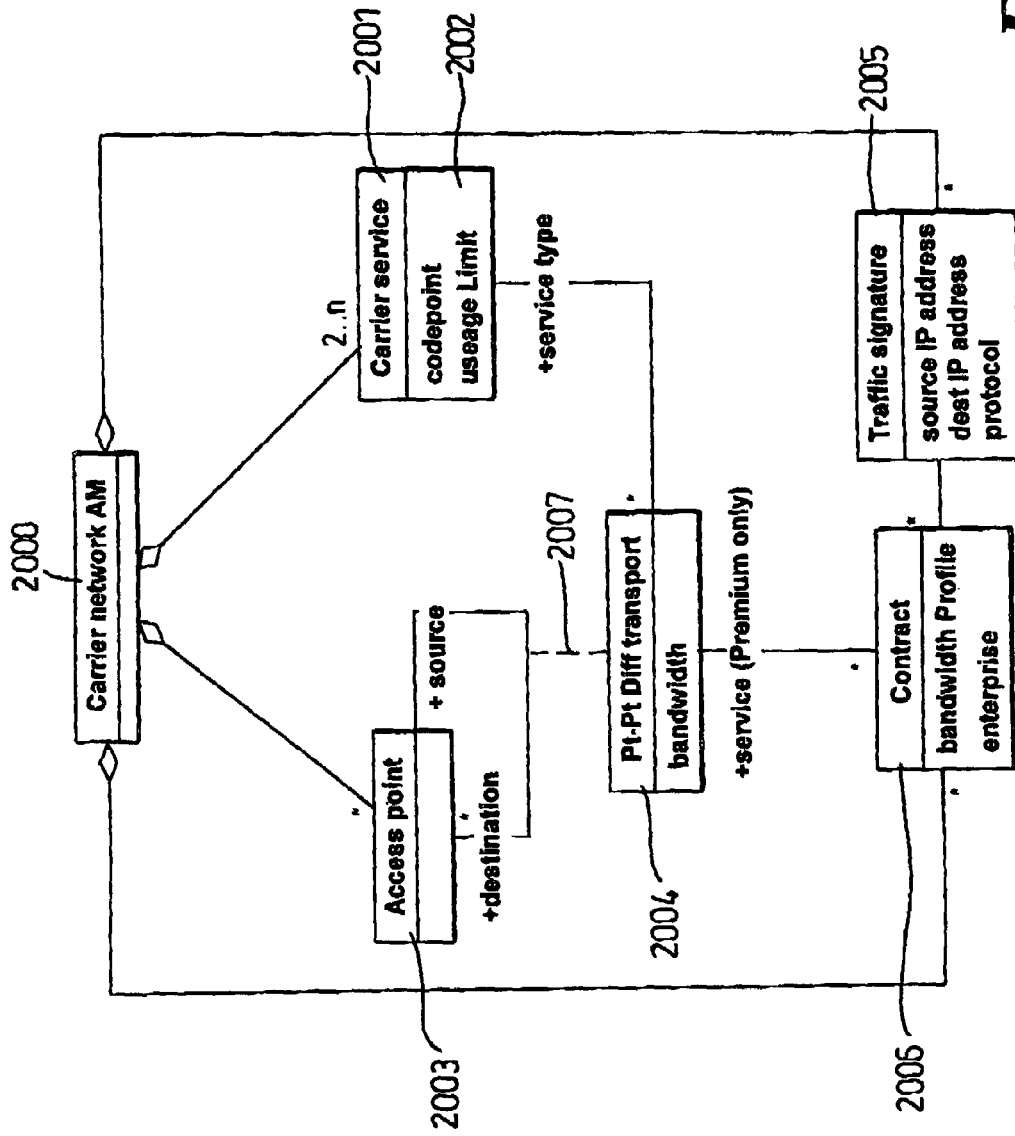
FIG. 25 is a class diagram of an example of a carrier service model.

FIGS. 25 to 29 are class diagrams using Unified Modelling Language (UML) notation. FIG. 25 shows an example of a carrier service model 54. The function of the carrier service model 54 is to capture and represent information about virtual leased line services provided over a communications network. This information is advantageously represented in a form which enables management of the virtual leased lines and creation of new virtual leased lines to be facilitated. A carrier network object (AM, application model) 2000 is used to represent information about virtual leased line services provided over a network. A carrier network object 2000 is composed of the following objects:
 zero or more access point objects 2003, used to represent an ingress or an egress access point for a virtual leased line;
 Two or more carrier service objects 2001 used to represent a service type, such as premium rate or best effort
 zero or more contract objects used to represent information about an enterprise and bandwidth profile associated with a virtual leased line; and
 zero or more traffic signature objects used to represent a source and destination IP address and a protocol associated with a virtual leased line contract.

A carrier service object 2001 is an instance of a carrier service class which has attributes 2002 which comprise a codepoint value and a useage limit. The useage limit represents the threshold level of bandwidth that may be allocated for traffic corresponding to a particular service type at any one node or link. As discussed above, this threshold level is set by the user.

Each pair of access point objects 2003 representing corresponding source and destination points is associated with a point to point differentiated transport object 2004 as indicated by dashed line 2007. This object is used to represent a bandwidth value which provides an indication of the required bandwidth over a path between the ingress and egress access points. This bandwidth value is used to check bandwidth availability by combining the bandwidth values (obtained from the bandwidth tallies as part of the mapping process described below) for each node and link along the path.

In the case that the carrier service is a premium rate service, the point to point differentiated transport object 2004 is associated with a contract object 2006 and this in turn is associated with a traffic signature object 2005.

Traffic signatures can be shared by many contracts.

Figure 26:
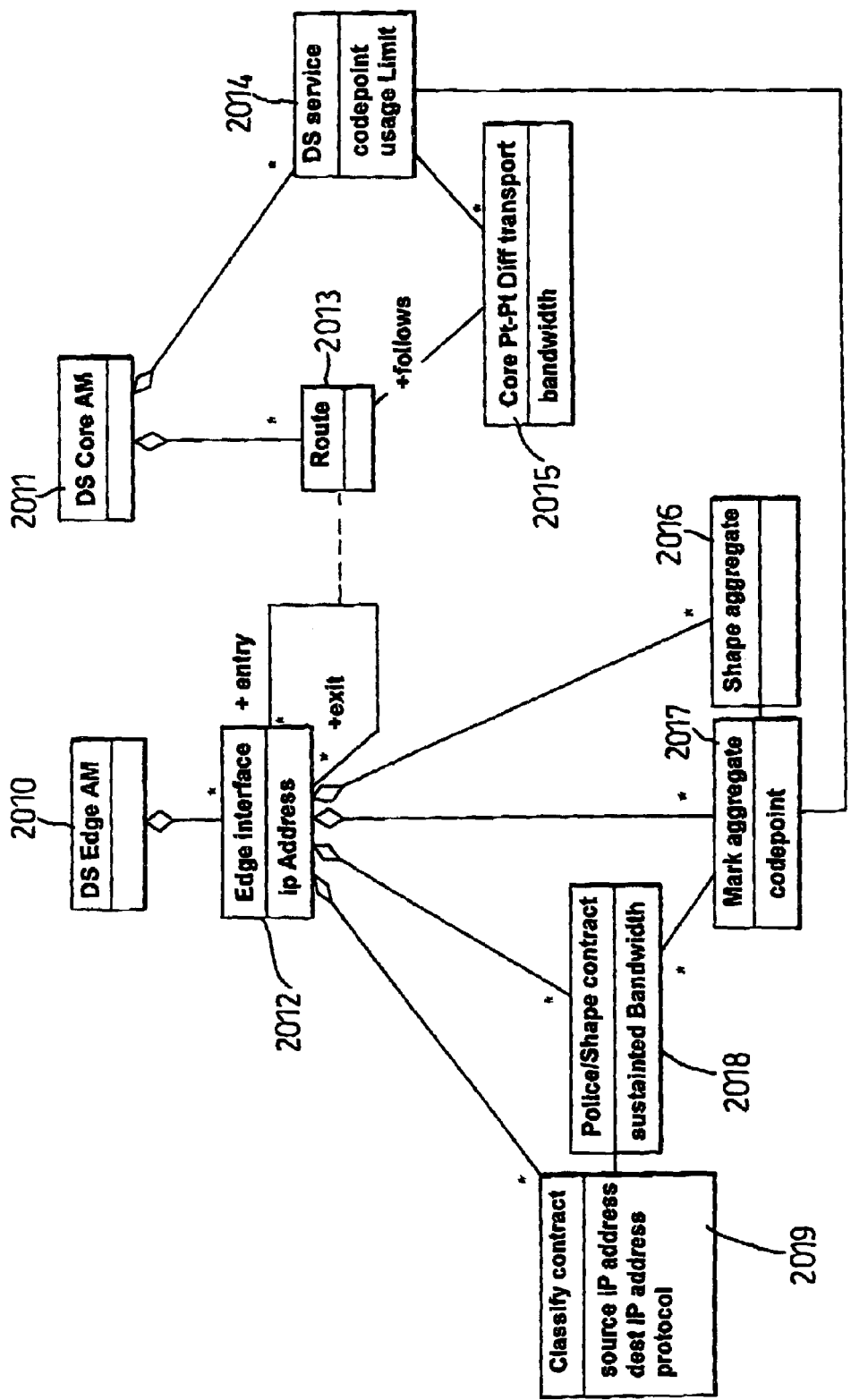
FIG. 26 is a class diagram of an example of a differentiated service model.

FIG. 26 is a class diagram of an example of a differentiated services model 55. The function of this model is to capture and represent information about the particular differentiated service mechanism that is implemented on the communications network being managed. In order to do this, separate classes (edge 2010 and core 2011) are used to represent the behaviour at edge and core parts of the network. An edge object 2010 is composed of many edge interface objects 2012 each of which represents an internet protocol address for either an entry or an exit point within a virtual leased line.

Each edge interface object 2012 is composed of the following objects:
- zero or more classify contract objects 2019 each of which is used to represent a mechanism for classifying traffic which uses a virtual leased line. This object 2019 has source and destination IP address and protocol attributes which reflect details of information agreed in the virtual leased line contract.
- Zero or more police/shape contract objects 2018 each of which is used to represent a mechanism for policing and/or shaping traffic which uses a virtual leased line. This object 2018 has a sustained bandwidth attribute which represents a bandwidth level specified as being provided under the virtual leased line contract.
- Zero or more mark aggregate objects 2017 each of which represents a mechanism for marking traffic according to its service level e.g. premium rate.
- Zero or more shape aggregate objects 2016 each of which is used to represent a mechanism for shaping traffic which uses the virtual leased line.

The classify contract 2019, police/shape 2018, mark aggregate 2017 and shape aggregate 2016 objects are associated with one another as illustrated in FIG. 26.

Pairs of edge interface objects 2012 are associated with a route object 2018 which represents a route between the edge interfaces at each end of a virtual leased line. This route object 2013 is contained in a core object 2011. Each core object 2011 is composed of zero or more route objects 2013 because each core part of the network may contain several different routes. Each core object 2011 is also composed of a differentiated service object 2014 which represents information about the differentiated service implemented at the core part of the network. For example, the differentiated service object 2014 comprises a codepoint and a useage limit attribute. This differentiated service object 2014 is also associated with the mark aggregate object 2017 which also has the same codepoint attribute.

A core point to point differentiated transport object 2015 is associated with one or more route objects 2013 and one or more differentiated service objects 2014. The core point to point differentiated transport object 2015 has a bandwidth attribute which is used to represent an amount of available bandwidth over the route which is within the core of the network (i.e. which does not involve edge nodes). The core point to point differentiated transport object 2015 provides a means of representing a combination of the per hop behaviours along a route without specifying details about particular routers involved. This provides the advantage of a representation that is independent of specific routers and which will not be affected in the event that the manner in which routers are implemented is changed.

Instances of a number of classes from the carrier service and differentiated services model are created when a contract requires them. Alternatively, these instances of classes are created as soon as the differentiated services mechanism is implemented over the network being managed.

Figure 27:
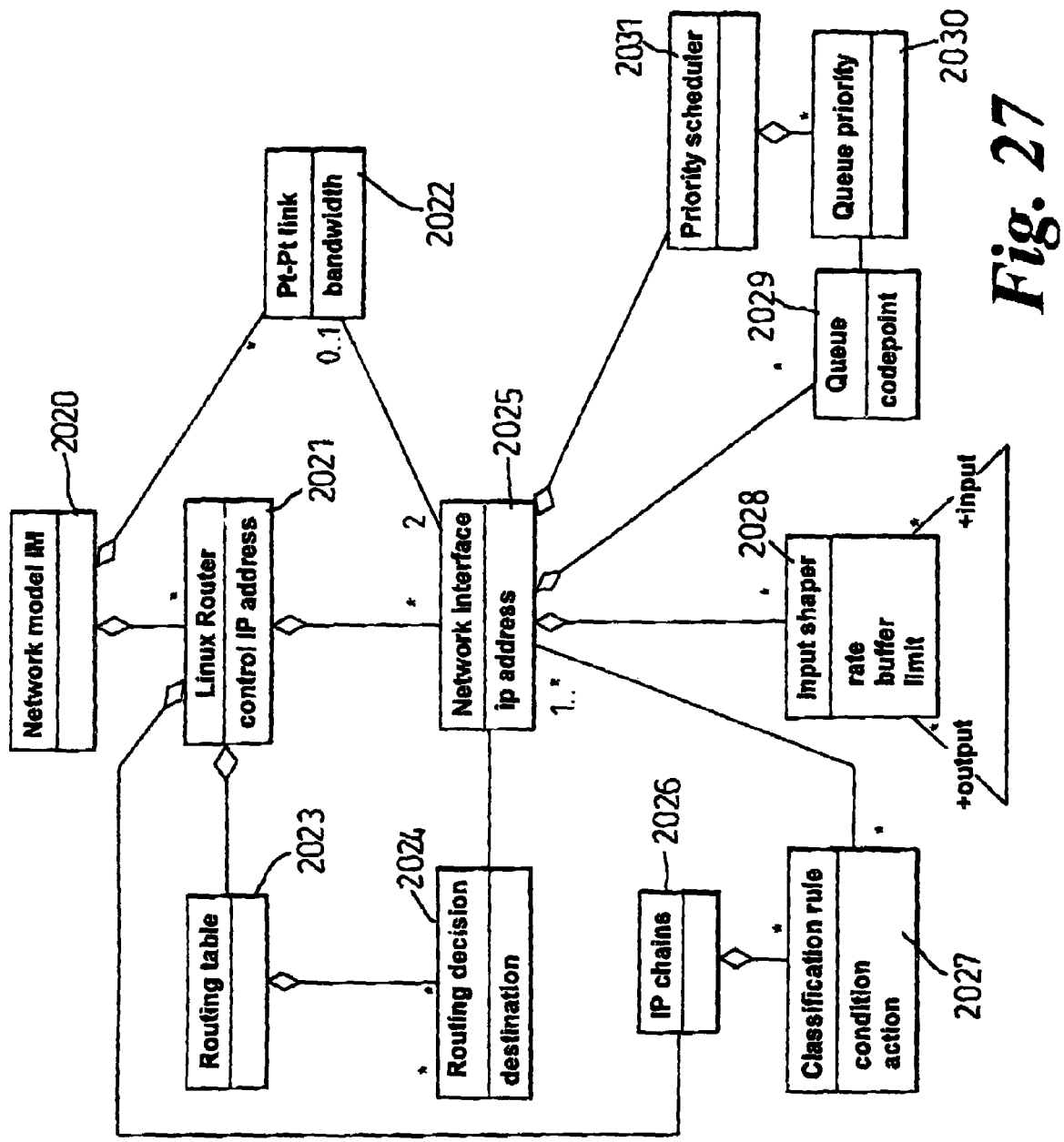
FIG. 27 is a class diagram of an example of a network model.

FIG. 27 is a class diagram of a network model 56. The function of this model is to capture and represent information about the network upon which virtual leased lines are to be provided. This information is represented in a manner such that the task of managing the virtual leased lines is facilitated.

A network model object 2020 is composed of zero or more point to point link objects and zero or more router objects 2021. In the example shown in FIG. 27 the router object represents a particular type of router, a Linux based Router. However, this is not essential, any suitable type of router or a generalised router may be represented by each router object 2021.

The router object 2021 is composed of zero or more network interface objects 2025 which represent the network interfaces that a router has. Each network interface object is associated with zero or one point to point link objects 2022 because each interface is connected to zero or one link. Similarly, each point to point link object 2022 is associated with two network interface objects 2025, one for each end of that link.

Each router object 2021 is composed of a routing table object 2023 which represents the routing table for that router. The routing table object 2023 itself is composed of zero or more routing decision objects each of which is associated with one network interface object 2025. A routing table comprises, for a given required destination of a packet, a corresponding output interface for the router concerned. This information is represented using the routing table 2023, routing decision 2024 and network interface 2025 objects and their inter-relationship.

The network interface object 2025 is composed of the following objects:
- zero or more input shaper objects 2028 for representing information about any shaping mechanism that is applied at the associated network interface, for example, to smooth bursty data streams.
- zero or more queue objects 2029 for representing queues at the associated network interface; and
- One priority scheduler object 2031 for representing how traffic at the associated network interface is prioritised.

The priority scheduler object 2031 is composed of zero or more queue priority objects 2030, each of which is associated with a queue 2029 object. This enables the queues at a given interface, their priorities and how they are scheduled to be represented.

In the case that the router object 2021 represents a Linux Router then each router object is composed of one IP Chain object 2026. Each IP Chain object 2026 is in turn composed of zero or more classification rule objects 2027 for representing information about how the classification of traffic for the differentiated service mechanism is carried out at the associated Linux Router. Each classification rule object 2027 is also composed of one or more network interface objects 2025.

Figure 28:
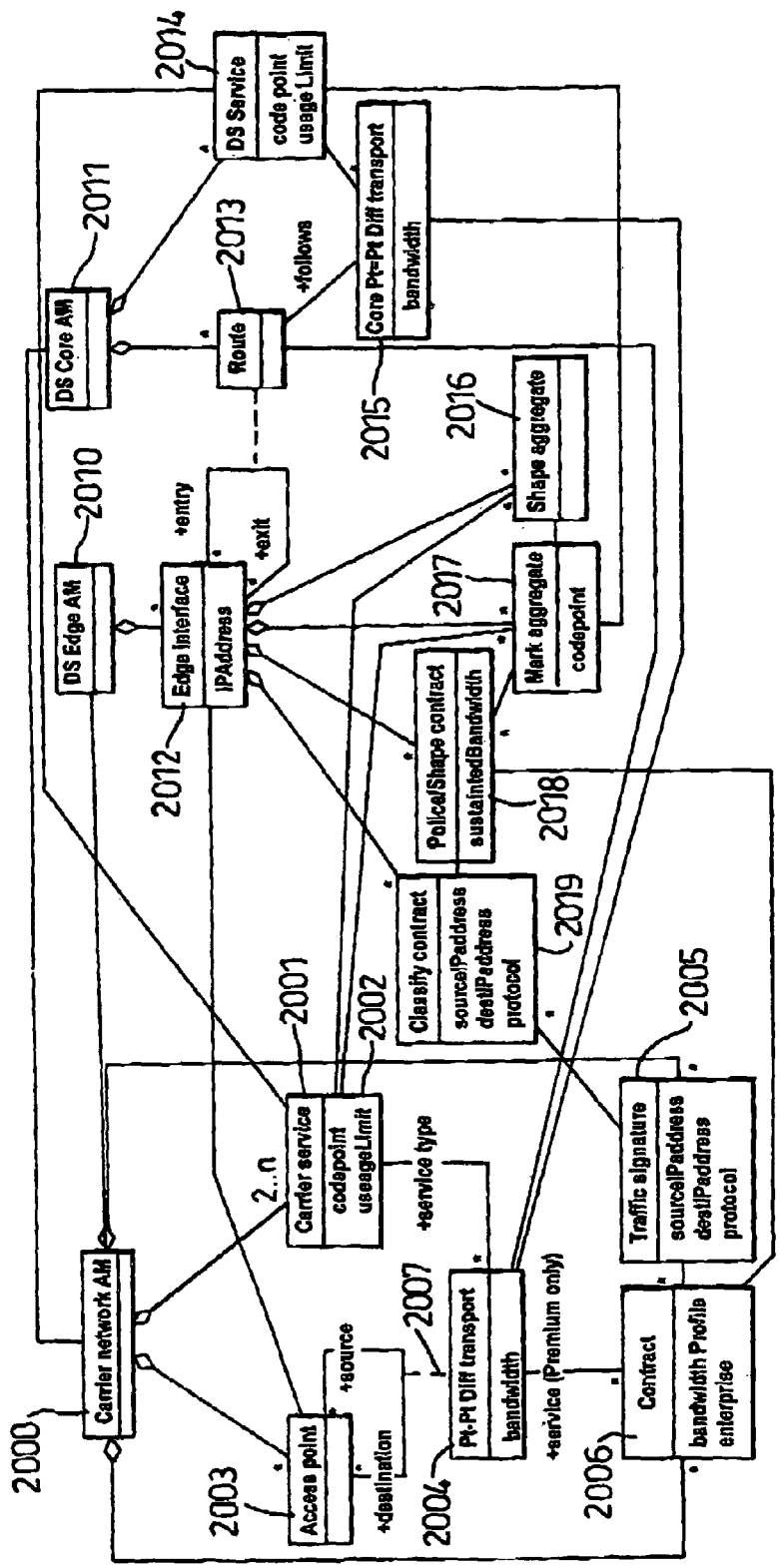
FIG. 28 shows the class diagrams of FIGS. 25 and 26 and a mapping between these.

An example of a mapping between the models 54, 55, 56 is now described. FIG. 28 is a class diagram showing the class diagrams of FIGS. 25 and 26 and a mapping between these two class diagrams. The same reference numerals are used for the objects as in FIGS. 25 and 26. Each class in the carrier service model is linked by mapping links to one or more classes in the differentiated service model. In this way the carrier service model is mapped to the differentiated service model.

For example, the access point class 2003 of the carrier service model is mapped to the edge interface class 2012 in the differentiated service model. This allows the relationship, that each access point is realised by an edge interface to be represented.

The carrier network class 2000 of the carrier service model is mapped to both the core and edge classes 2010, 2011 of the differentiated service model. This represents the way that a carrier network is realised by core and edge behaviours.

The carrier service class 2001 of the carrier service model is realised by the differentiated service class 2014, the shape aggregate class 2016 and the mark aggregate class 2017 of the differentiated service model. Each service type, such as premium rate, has an associated mark or codepoint by which traffic under that service is identified as well as an associated shape aggregate and useage limit.

The point to point differentiated transport class is realised by each of the route class and the core point to point differentiated transport class of the differentiated service model. This reflects the association between the required bandwidth value of the point to point differentiated transport class with the related bandwidth value for the associated route.

The contract class 2006 of the carrier service model is realised by the police/shape contract class 2018 of the differentiated service model. Also, the traffic signature class 2005 of the carrier service model is realised by the classify contract class 2019 of the differentiated service model.

Figure 29:
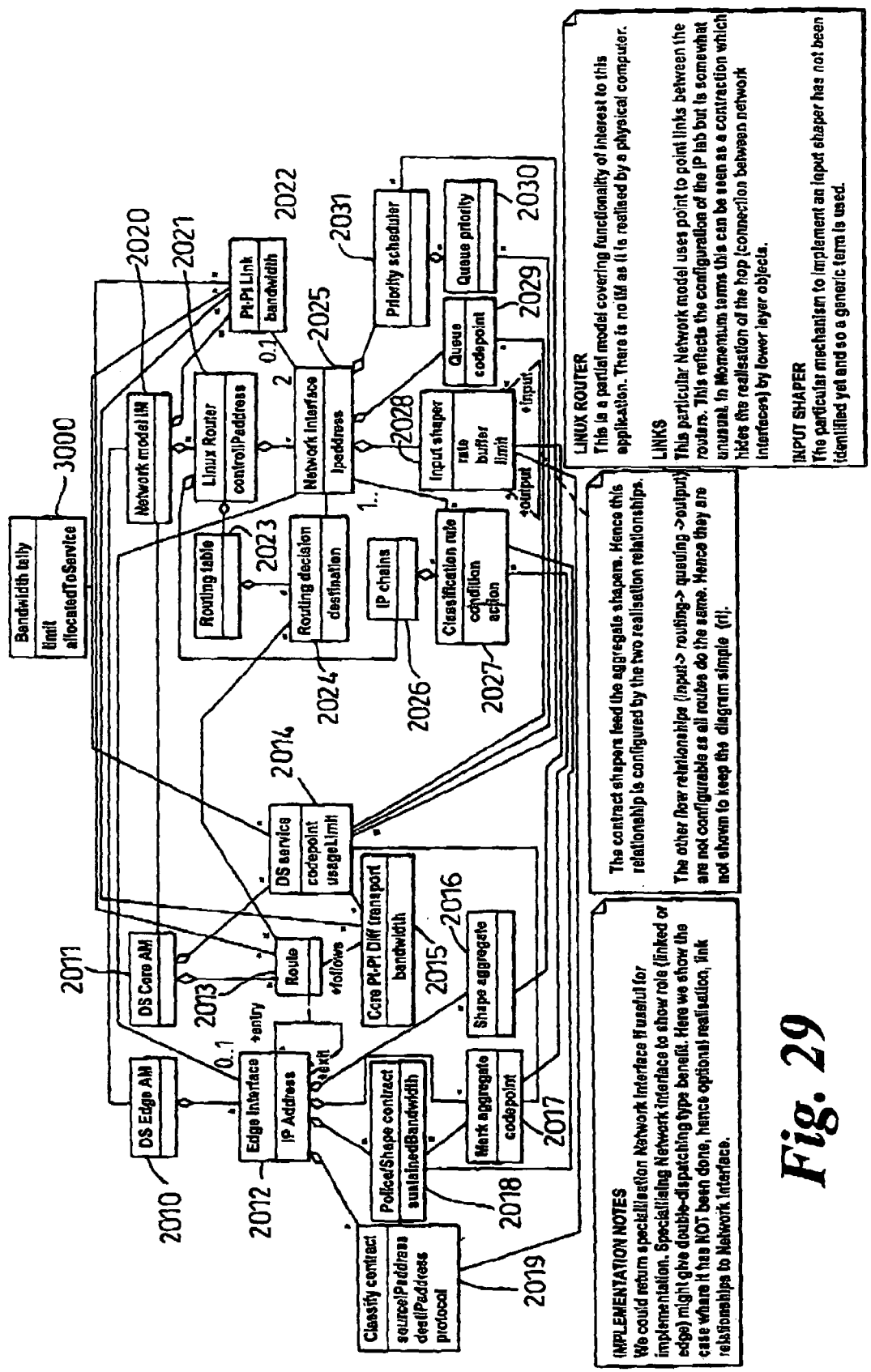
FIG. 29 shows the class diagrams of FIGS. 26 and 27 and a mapping between these.

FIG. 29 is similar to FIG. 28 except that it illustrates a mapping between the differentiated service model of FIG. 26 and the network model of FIG. 27. The same reference numerals are used for the objects as in FIGS. 26 and 27. Each class in the differentiated service model is realised by mapping links to one or more classes in the network model.

For example, the differentiated service edge and core classes 2010, 2011 are realised by the network model class 2020 of the network model. This indicates that a network implements edge and core behaviours. An edge interface object 2012 is realised by zero or one network interface objects 2025 and a route object 2013 is realised by zero or more point to point link objects 2022 and zero or more interleaved routing decision objects 2024. Each core point to point differentiated transport object 2015 is realised by zero or more point to point link objects 2022. In this way information about links for a particular route is available to a core point to point differentiated transport object associated with that route.

A differentiated service object 2014 is realised by four classes of object in the network model. These include zero or more point to point link objects 2022, zero or more queue objects 2029, zero or more queue priority objects 2030 and zero or more priority scheduler objects 2031.

Each classify contract object 2019 is realised by a classification rule object 2027 and each police/shape contract object 2018 is realised by an input shaper object 2028. Each mark aggregate object 2017 is realised by zero or more classification rule objects 2027 and each shape aggregate object 2016 is realised by an input shaper object 2028.

An additional class 3000 is shown in FIG. 29 to represent bandwidth tallies. This class is associated with the mapping between a route object 2013 and a point to point link object 2022.

In the case that a particular communications network is being managed a network model 56 representing that communications network is created using a pre-specified representation such as that illustrated in FIG. 27. Information from that network model 56 may then be fed or propagated upwards to the differentiated service model to influence the specific form of that model. Similarly, information from the differentiated service model may be fed upwards to the carrier service model. It is also possible for this feeding or propagating function to operated in the other direction, from the carrier service model, to the differentiated service model to the network model. For example, the bandwidth attribute of the point to point differentiated transport object provides a means by which required bandwidth for a route may be represented. As bandwidth tallies change, or as a user selects and pins different routes, information from the network model is fed up to the differentiated service model and to the carrier service model to check the bandwidth attribute of the point to point differentiated transport. By accessing this bandwidth attribute a user is quickly able to assess the feasibility of a proposed virtual leased line with a particular route.

It is not essential to use three separate models for the carrier service, differentiated service and network; instead one model to represent the combination of these three models can be created. However this is complex and hard to adapt in the case that changes are made, for example, if a new differentiated service mechanism is employed that requires modifications to be made to the class diagram for the differentiated service model. By using three separate models and mapping these onto one another it is possible to replace one of the models by another example of that type of model, in a type of "plug and play" fashion. This is extremely advantageous in the event that adaptation of the models is required.

Outputs from the models, such as information about a proposed particular virtual leased line is provided either to a simulator or directly to the communications network being managed, as described above. For example, outputs provided directly to the communications network are transmitted using a command interface such as Telnet.

An example of a graphical user interface for a service management system, such as that of FIG. 2, is described in Appendix 1. It is also possible to use a separate graphical user interface for the network management system 20 itself or to provide GUIs for each model layer 54, 55, 56, as indicated by the arrows between the user interface 52 and each model layer 54, 55, 56 in FIG. 5.

An SLA model is also described in Appendix 1. The carrier service model 54 of FIG. 5 is an example of at least part of such an SLA model. For example, the SLA model described in Appendix 1 could be used as a carrier service model 54. If the SLA model described in Appendix 1 were used in this way, and in conjunction with the particular example of a differentiated service model 55 described above, then the output of the carrier service model 54 would be transformed before mapping to the differentiated service model 55.

Figure 6:
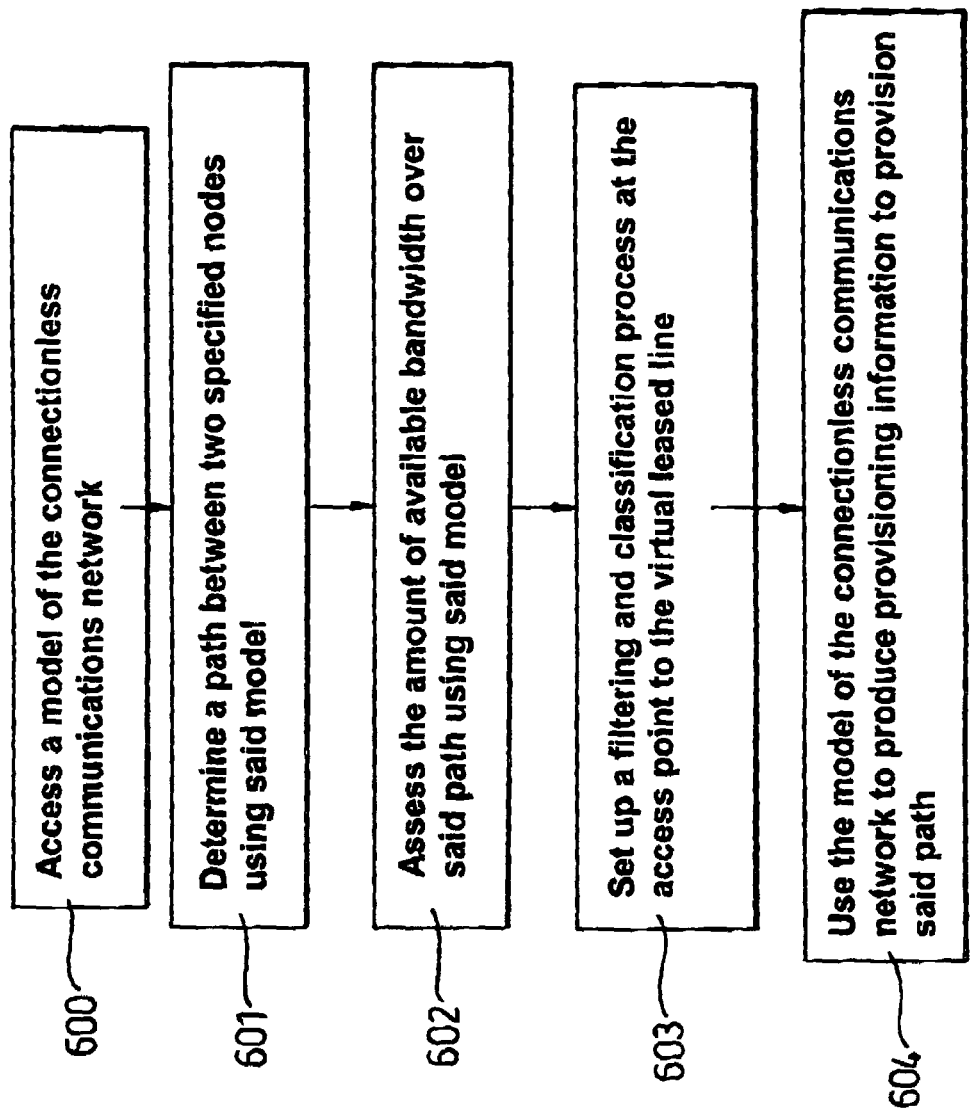
FIG. 6 is a flow diagram of a method of provisioning a path between two specified nodes in a connectionless communications network such that the path has a specified bandwidth and a guaranteed quality of service is provided over that path.

FIG. 6 is a flow diagram of a method of provisioning a path between two specified nodes in a connectionless communications network such that the path has a specified bandwidth and a guaranteed quality of service is provided over that path, wherein said communications network supports a differentiated service mechanism, said method comprising the steps of:
    accessing a model of the connectionless communications network (box 600);

determining a path between the two specified nodes using said model (box 601);

assessing the amount of available bandwidth over said path using said model (box 602); and producing provisioning information to provision said path using said model (box 604).

Preferably, the model of the connectionless communications network comprises three sub-models or layers, one which represents the virtual leased lines provided over the network, one which represents the differentiated service supported over the network and one which represents the topology of the network. This is illustrated in FIG. 5 where there are three layers of model, 54, 55, 56.

The flow diagram of FIG. 6 also shows the steps carried out by a computer program for controlling a computer system to implement the method described immediately above. Any suitable programming language may be used to create the computer program and the program may be stored on a computer readable medium. The computer system itself comprises the service management system and parts of the network management system that are required to carry out the method described herein. For example, the computer system may comprise a server or may be implemented on any general purpose information processing system such as a network node or router.

A range of applications are within the scope of the invention. These include situations in which it is required to provision a path between two specified nodes in a connectionless communications network such that the path has a specified bandwidth and quality of service. For example, provisioning a virtual leased line in an internet protocol communications network.

Appendix 1

FIGS. 7 to 15 illustrate displays of a graphical user interface (GUI) provided by the service management system 21. This GUI may be part of the user interface 52 illustrated in FIG. 5. Using this GUI a user, such as a service provider is able to control a service management system 21.

Figure 7:
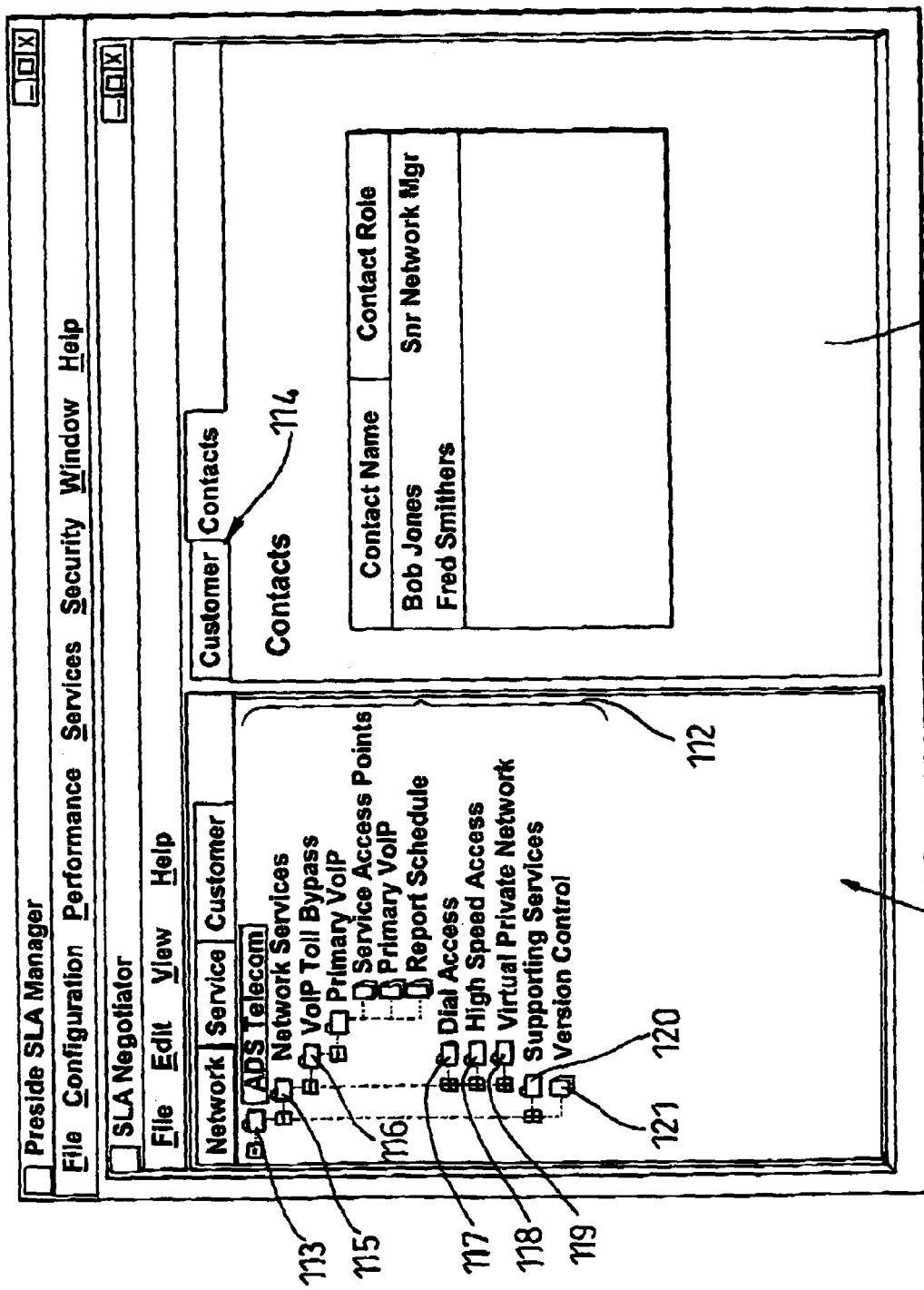
FIG. 7 shows a graphical user interface (GUI) display from a service management system giving details for a particular customer.

FIG. 7 illustrates a display from the GUI in which contact details for a particular customer are displayed. The display comprises two sides 110, 111, one of which enables a hierarchical representation 112 of available information relating to a particular customer, service or network to be displayed. The other side of the display contains the full information according to a user selection on part of the hierarchical display. The example in FIG. 7 shows a hierarchical representation of available information relating to a particular customer and in this case customer ADS Telecom 113 is selected. Names of people to contact at this customer enterprise are displayed on the right hand side 110 of the display. Alternatively, customer details such as the address and telephone number of the customer may be displayed by selecting a customer tab 114 to change the display on the right hand side.

In the example shown in FIG. 7, all the items in the hierarchical display 112 are within the ADS Telecom 113 part of the hierarchy and this indicates that they are all specific to that customer. Details of network services 115 provided to a particular customer are stored in the service management system and included in the hierarchical representation 112. For example, in the case in FIG. 7, customer ADS Telecom 113 is provided with a voice over IP service 116, a dial access service 117, a high speed access service 118 and a virtual private network (VPN) service 119.

Figure 11:
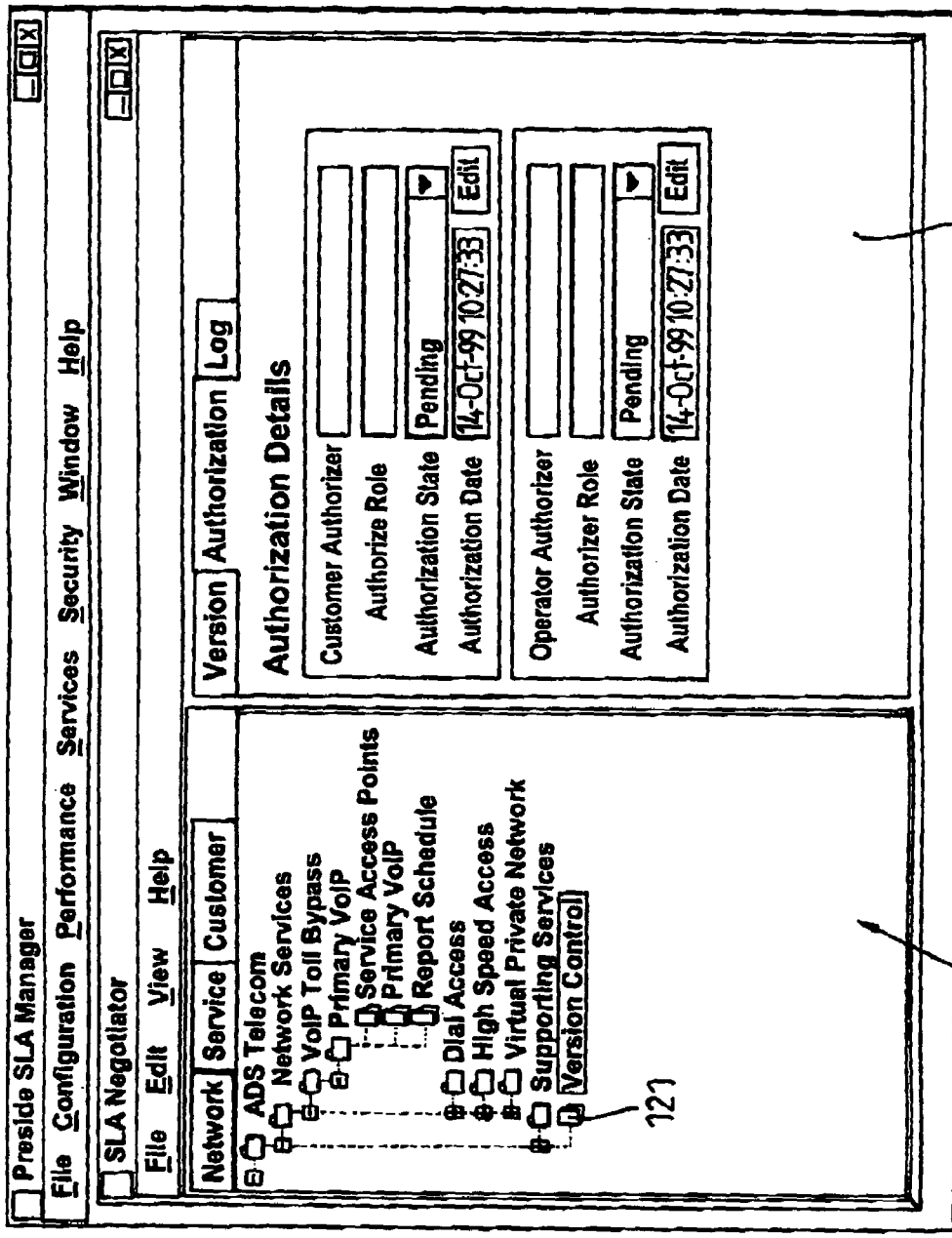
FIG. 11 shows a GUI display from a service management system giving version control information.

Details of supporting services 120 provided to a particular customer are also included in the hierarchical representation 112. Information about supporting services such as maintenance agreements specified as part of a service level agreement are displayed by selecting the supporting services folder in the hierarchical representation 112. In the case illustrated in FIG. 7, a version control icon 121 is shown. When this icon is selected details of different versions and updates to SLAs are displayed. FIG. 11 shows a GUI display in the case that the version control service 121 is selected. In that case, information about the version control service is displayed on the right hand side of the display 110. This includes authorisation details 151, which indicate the parties who have effectively "signed" the service level agreement.

Figure 8:
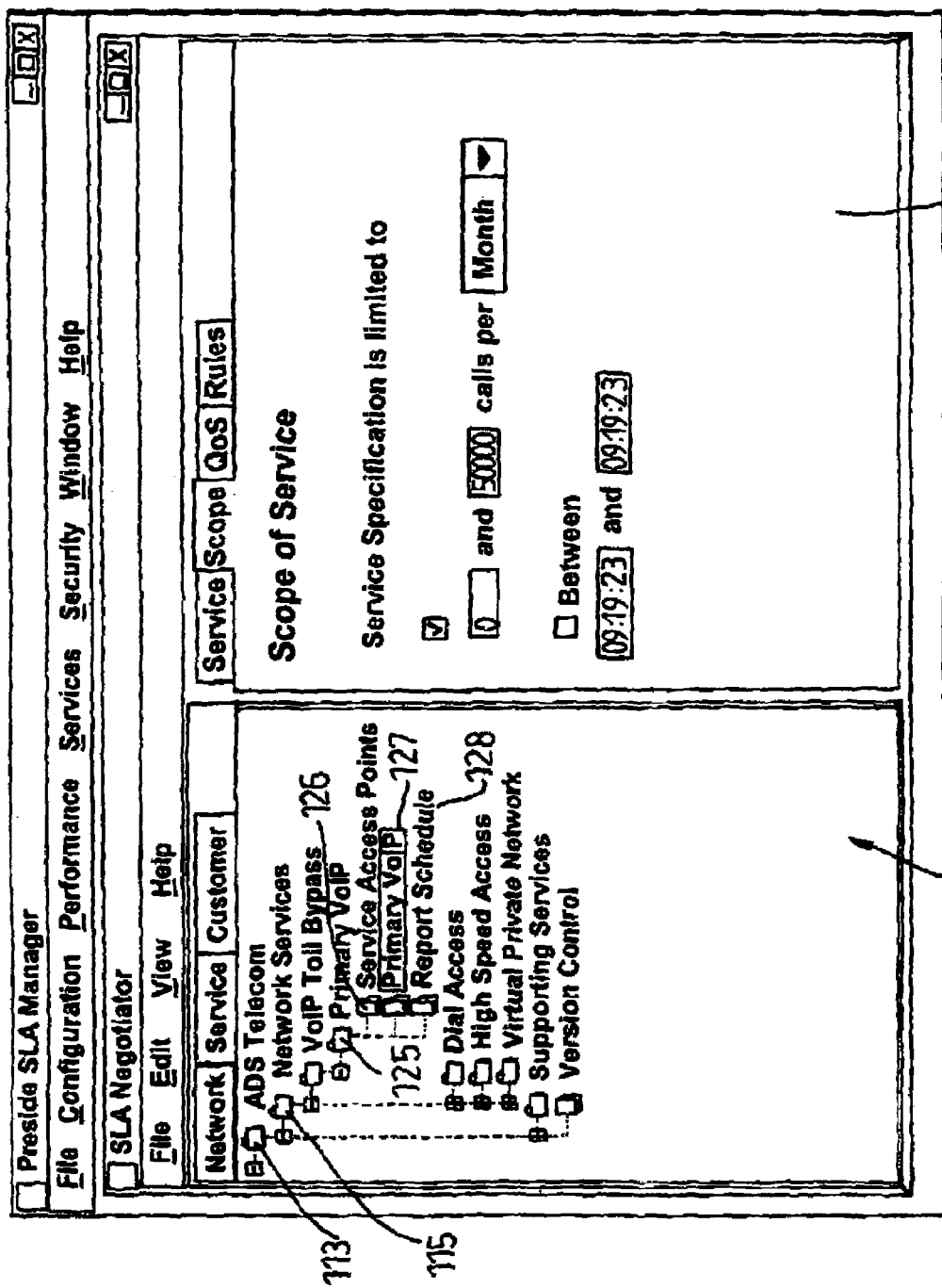
FIG. 8 shows a GUI display from a service management system giving details of the scope of service set out in a particular service level agreement.

Consider the situation in which a service provider wishes to define a SLA for customer ADS Telecom 113. The SLA is in respect of a particular type of service, say voice over an internet protocol communications network (VoIP). A sub folder is created within the hierarchical representation 112 at a level below the level for the particular customer 113 and below the level for a network service 115. In this example, the folder labelled "primary VoIP" 125 in FIG. 8 is created. Three individual documents or groups of information are created and stored within the folder labelled "primary VoIP" 125. The first of these documents 126 contains details of the service access points for the service level agreement being created or defined. The second of these groups of information contains the specification of the voice over internet protocol offered by the service provider under the SLA. The third group of information relates to reports to be provided to the customer or user and this is described in more detail below.

Figure 12:
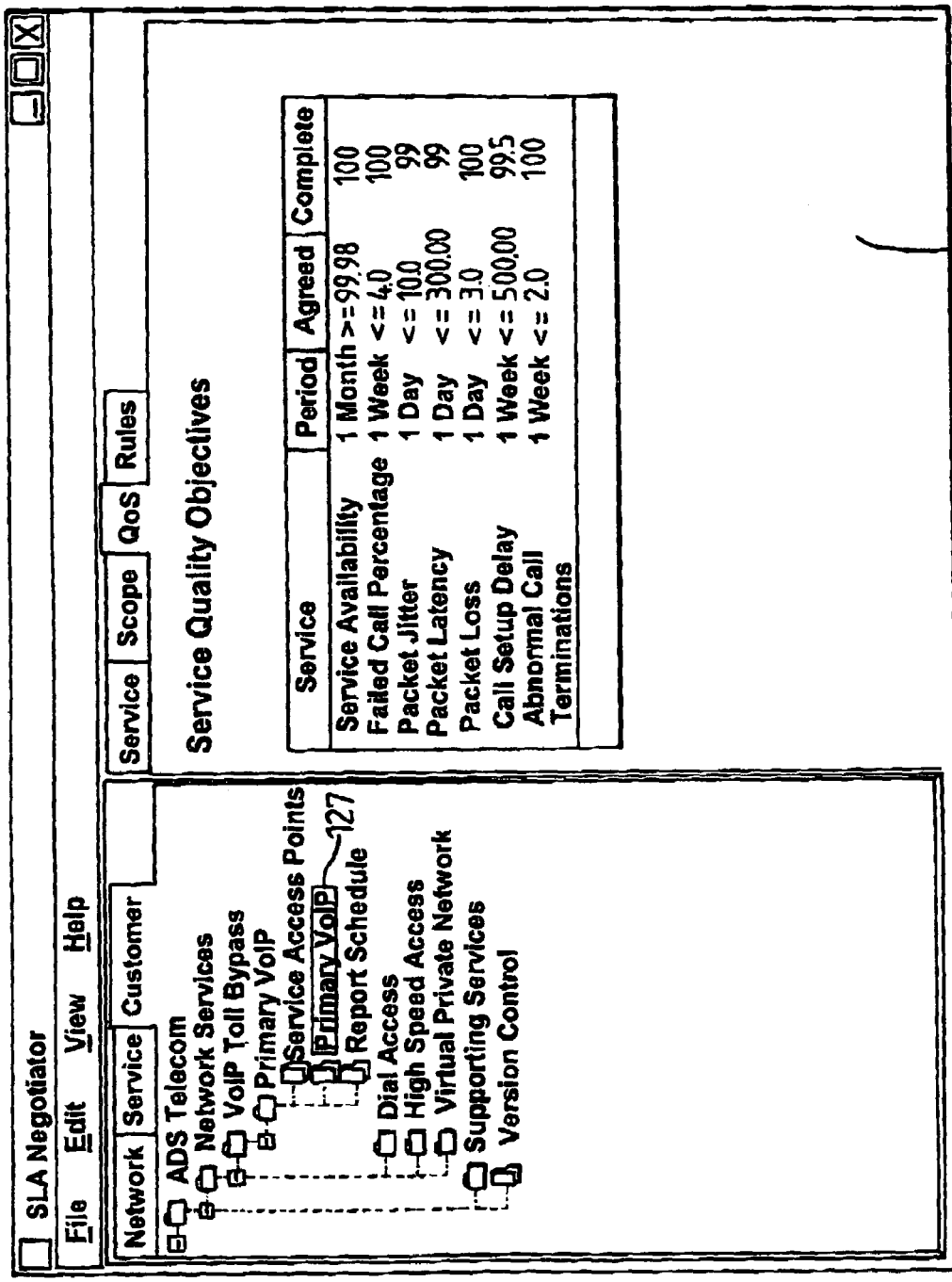
FIG. 12 shows a GUI display from a service management system giving service quality objectives set out in a particular service level agreement.

In the example illustrated in FIG. 8, the second group of information is selected and details of the service, scope of service, quality of service and rules may be displayed on the right hand side of the display screen 110 as illustrated in FIG. 8. For example, the scope of the service may be limited to a certain range of calls per month which are made between certain times of day. FIG. 12 also shows a GUI display where the second group of information is selected and where quality of service information is selected on the right hand side of the display 110. These examples of information specifying the service to be provided are examples only. Other parameters can be used to specify the service to be provided. Using the displays of the GUI a user is able to enter details about a service level agreement, for example, by typing information into dialogue boxes in the GUI, such as those on the right hand side of the display 110.

Figure 9:
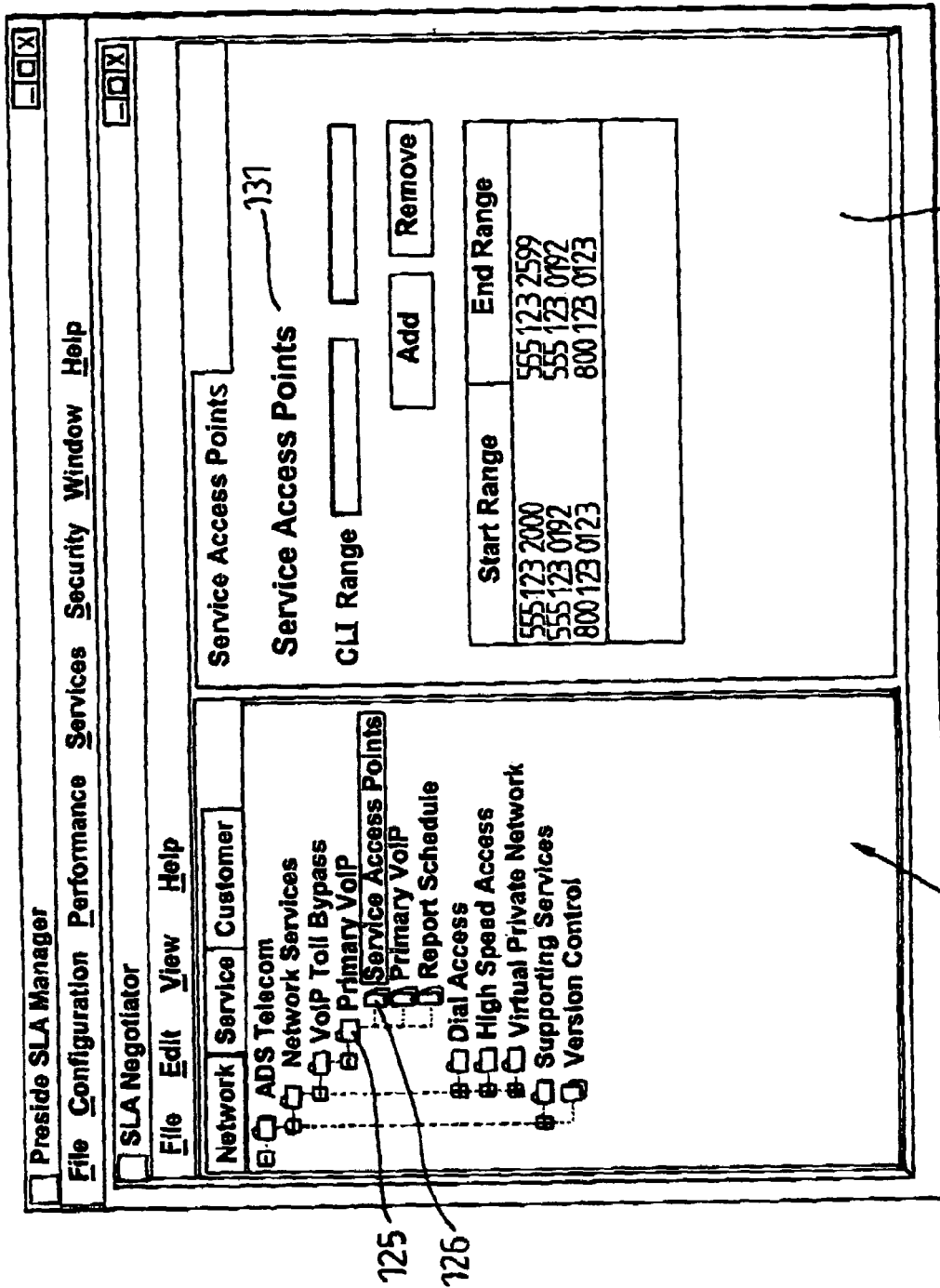
FIG. 9 shows a GUI display from a service management system giving details of service access points set out in a particular service level agreement.

FIG. 9 illustrates a GUI display screen when the service access points 126 level of the primary VoIP service 125 is selected. In this situation, the display on the right hand side of the screen 110 shows details 131 of the service access points for the particular customer and service level agreement concerned. A user is able to enter details about the service access points or to view these.

Figure 10:
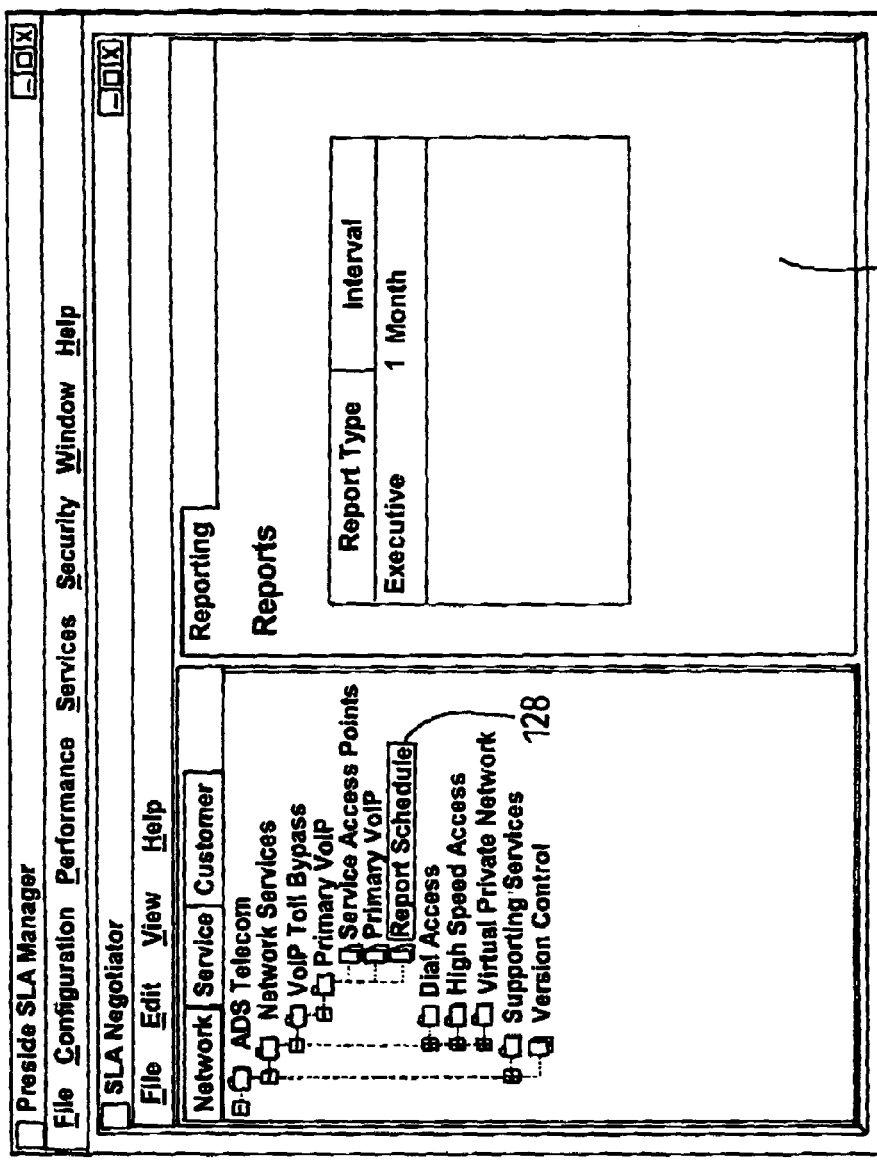
FIG. 10 shows a GUI display from a service management system giving details of reporting requirement of a particular service level agreement.

Associated with a particular SLA are details of the type and frequency of reports that are required about performance in relation to that SLA. This information is stored as a report schedule document or group of information 128 below the level in the hierarchical representation for the service concerned. FIG. 10 illustrates a GUI display where the report schedule part of the hierarchical representation is selected and information about the required reports is displayed on the right hand side 110.

Figure 13:
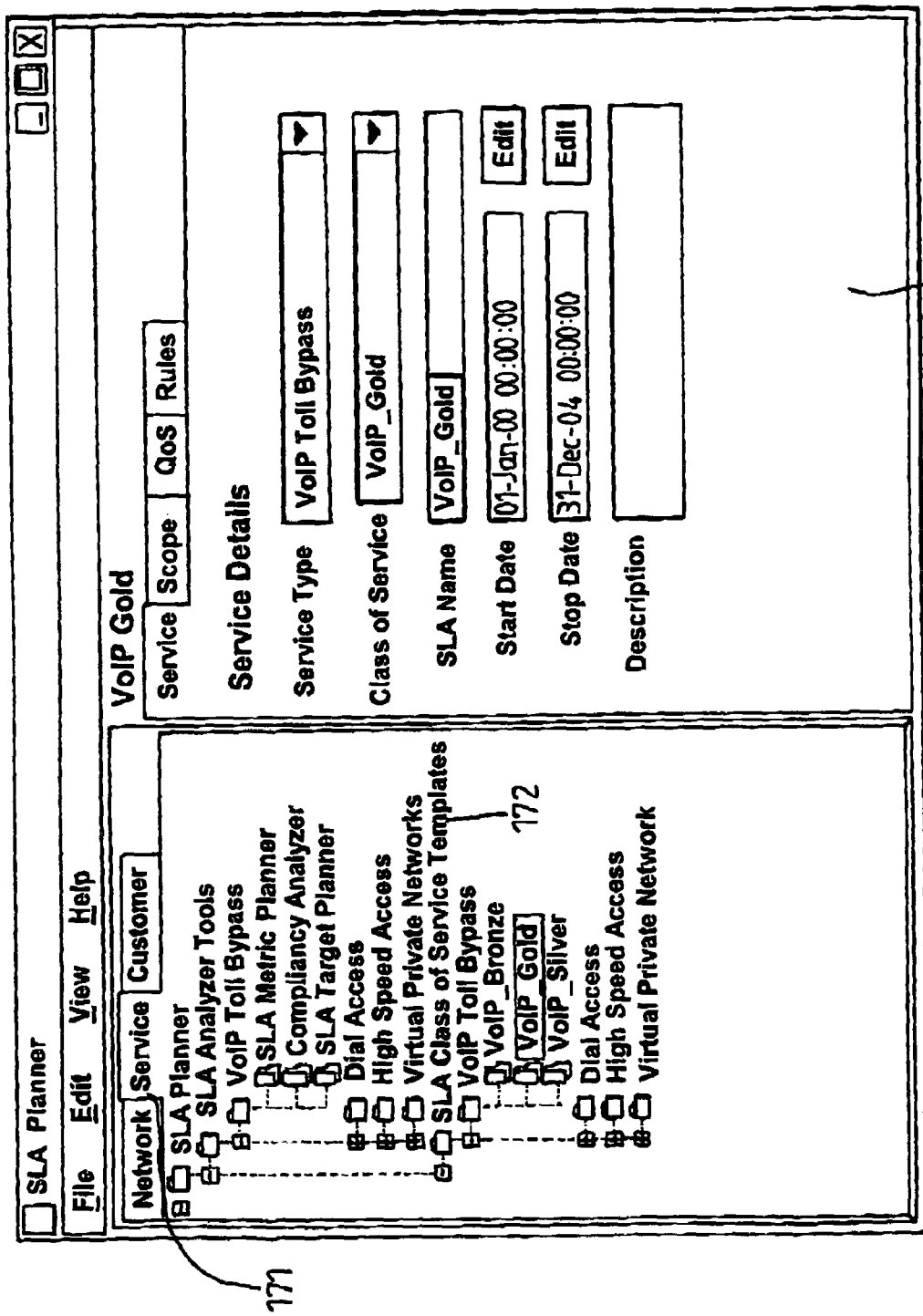
FIG. 13 shows a GUI display from a service management system giving service details for a particular class of service.

Consider the situation in which a service provider wishes to define a class of service for customers. In this situation a user such as a service provider selects a service tab 171 above the hierarchical representation 112. This causes the hierarchical display to change to show only items relating to services of particular types, rather than to a customer or network of a particular instance, as illustrated in FIG. 13. In order to define a new class of service or to view the details of a class of service, class of service templates 172 are used. For example, FIG. 13 shows three class of service templates labelled VoIP Bronze, Silver and Gold. If one of these templates 172 is selected then details about the contents of that template are shown on the right hand side of the display 110 as shown in FIG. 13. These details may be updated, entered into the service management system or viewed by the user.

Figure 14:
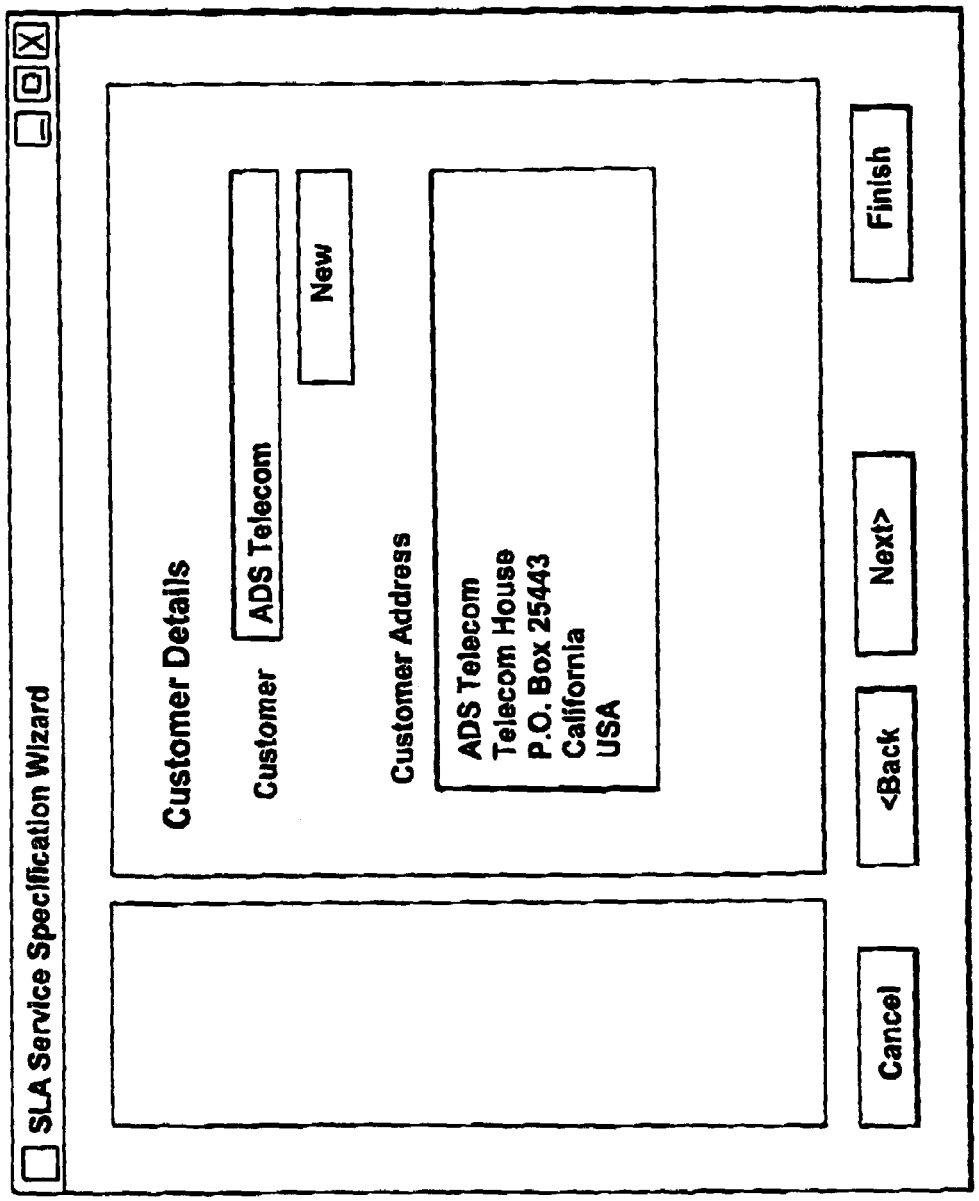
FIG. 14 shows a GUI dialogue box from a service management system.
Figure 15:
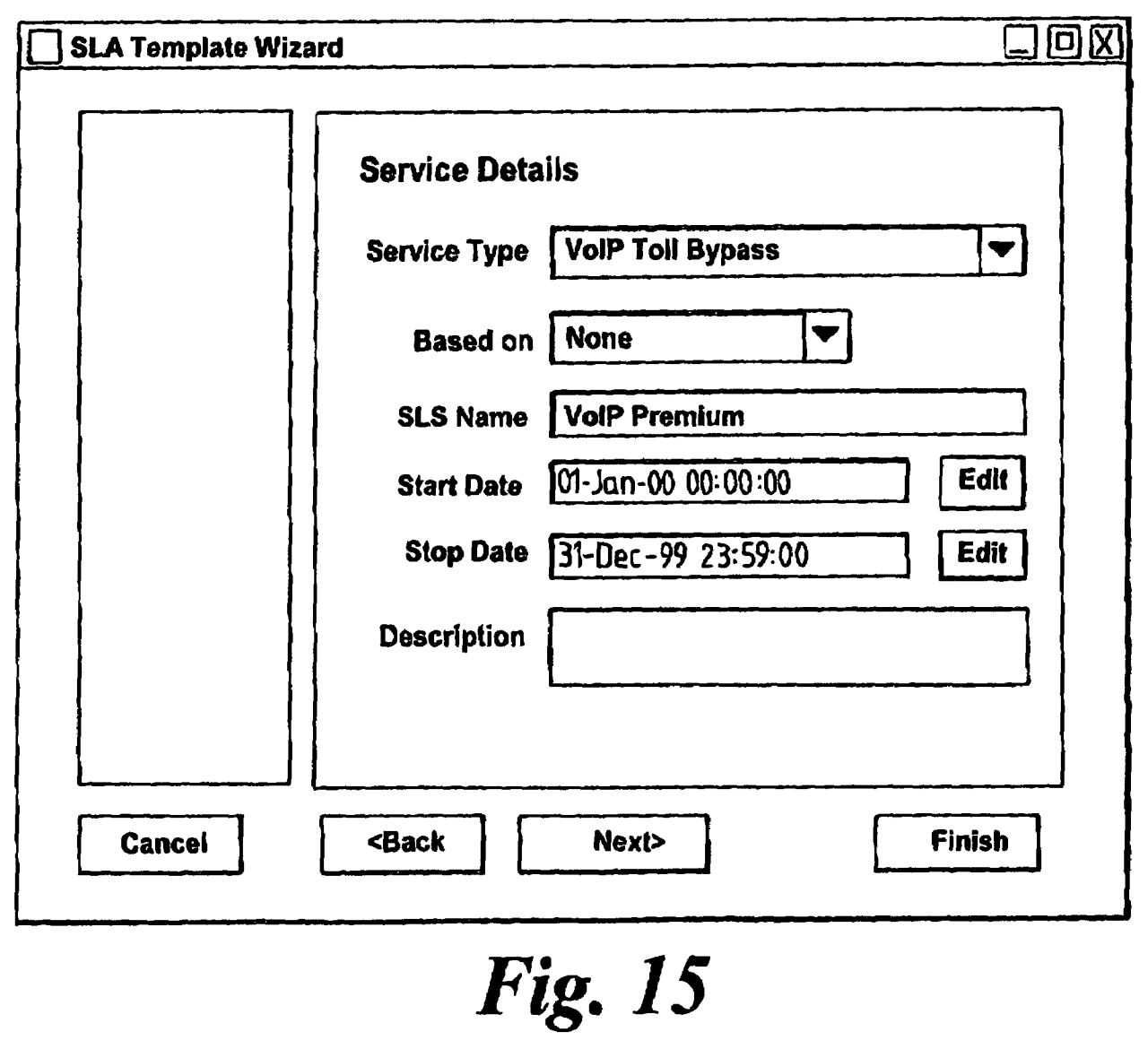

Sequences of dialogue boxes (also known as wizards) are provided to help the user to define or update service level agreements and service classes. FIG. 14 shows an example of a dialogue box from such a sequence for creating a service level agreement and FIG. 15 shows an example of a dialogue box from a sequence for creating a service class.

Figure 16:
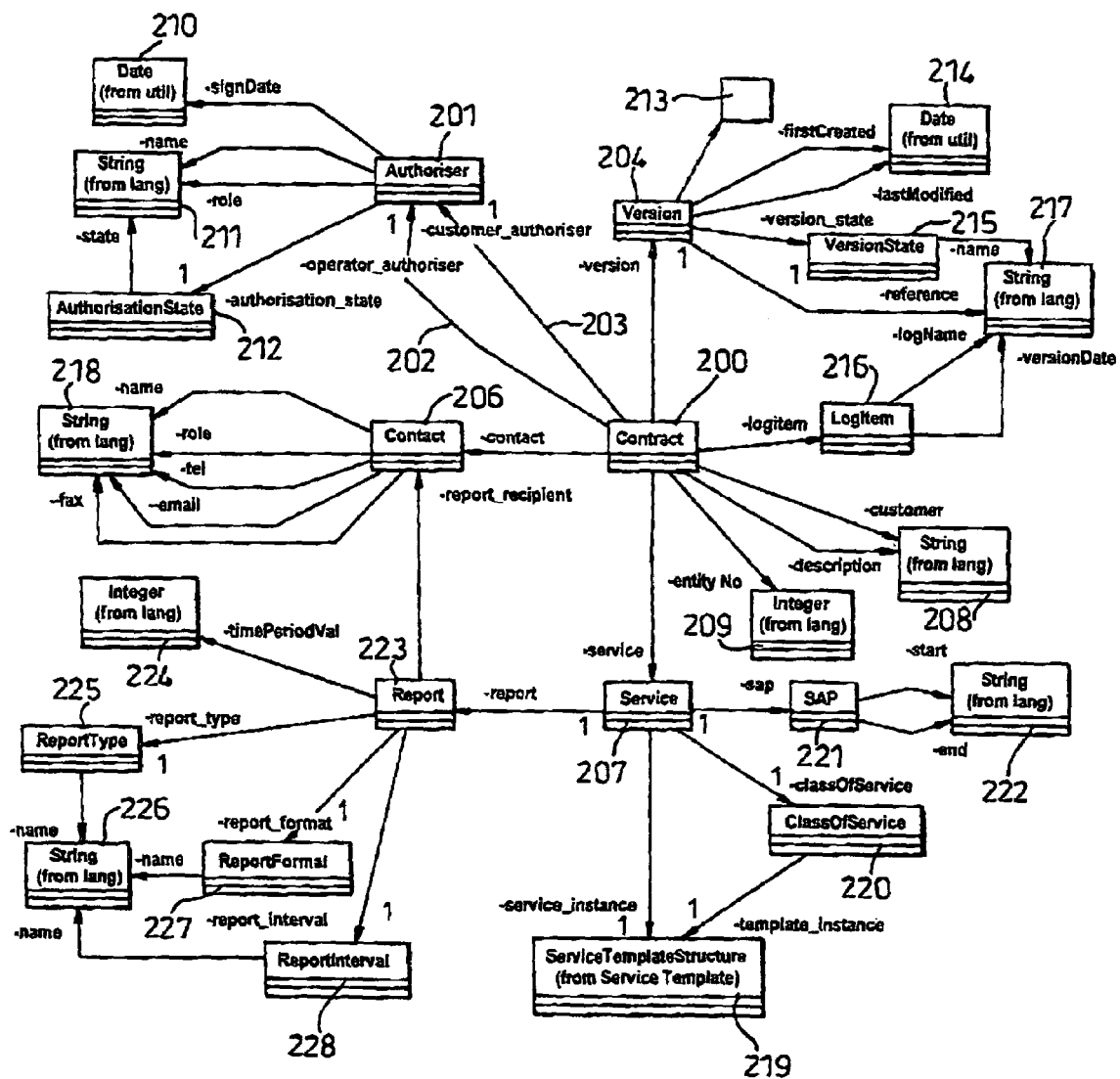
FIG. 16 shows a class diagram for representing service level agreement information.
Figure 17:
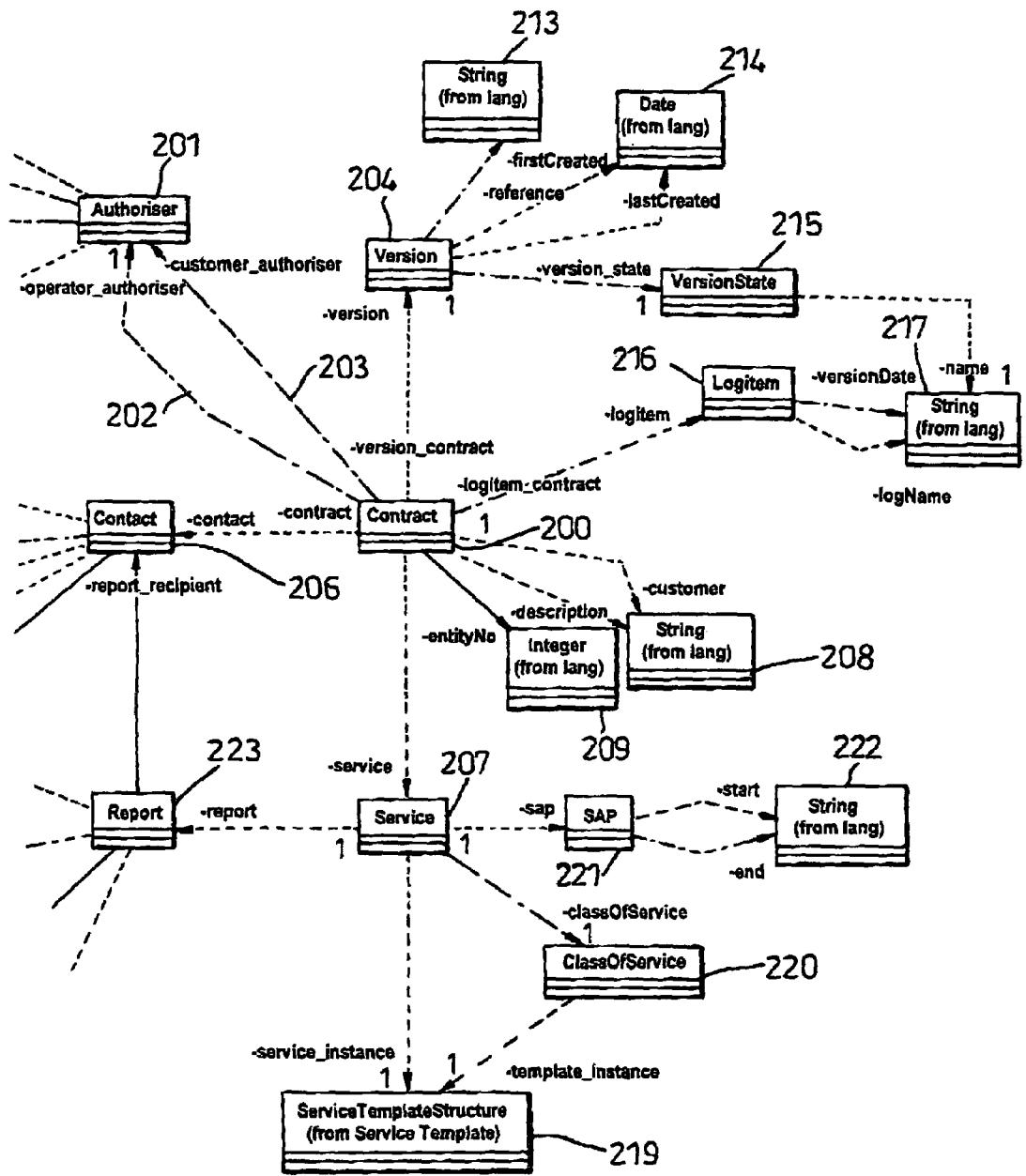
FIG. 17 is an enlarged view of part of the class diagram of FIG. 16.
Figure 18:
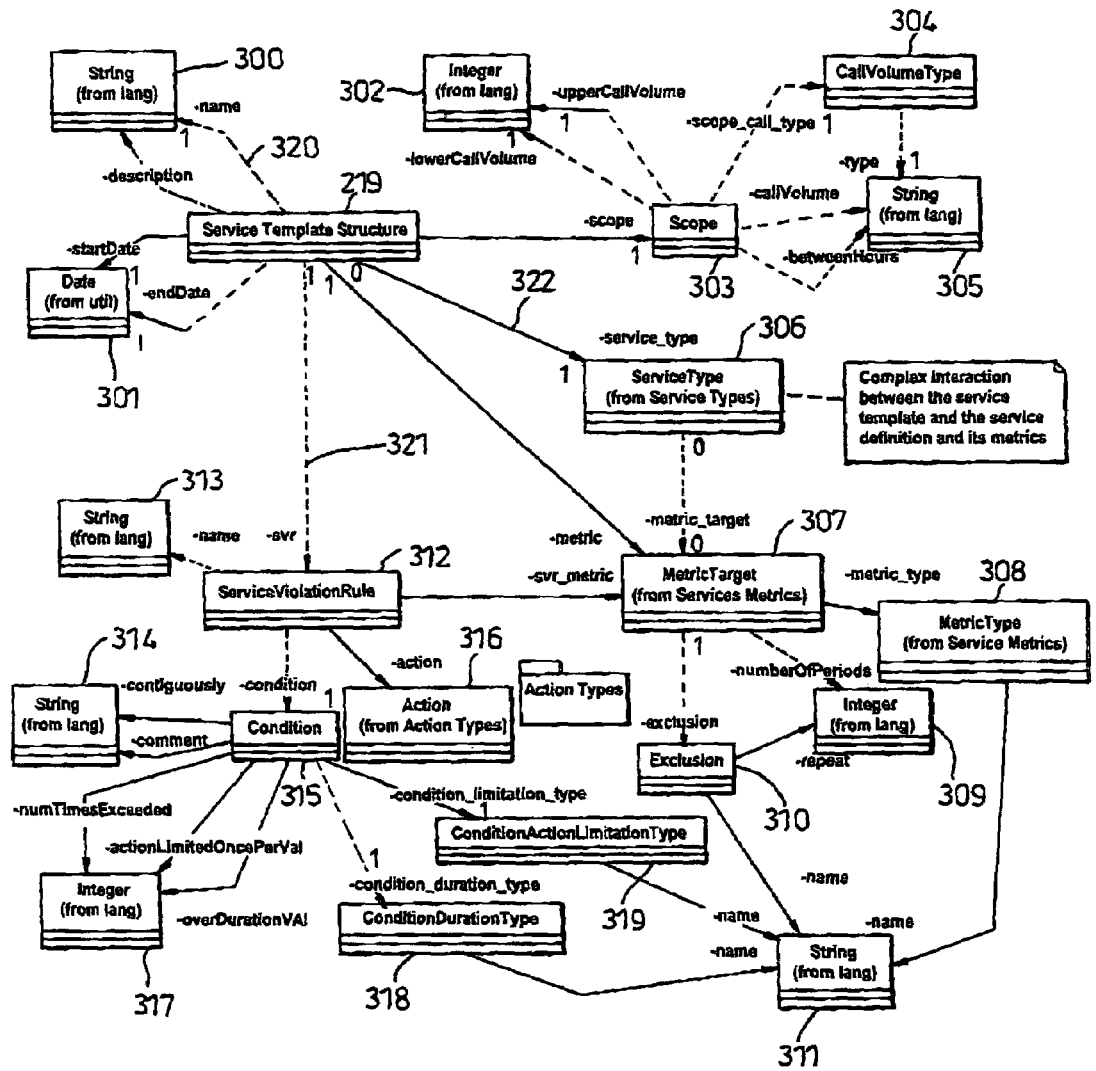
FIG. 18 is a class diagram for representing service class information.
Figure 19:
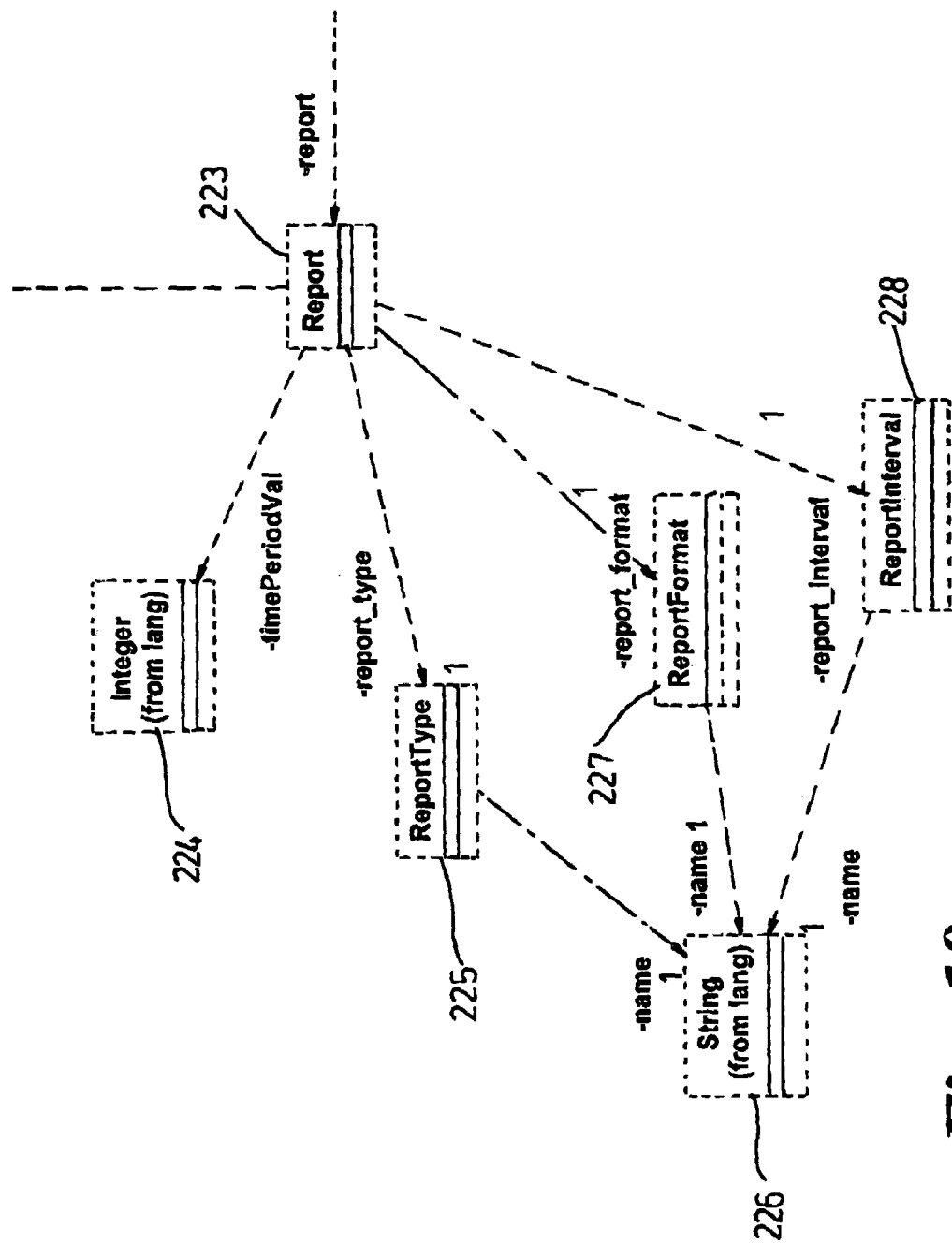
FIG. 19 is an enlarged view of part of the class diagram of FIG. 16.

The service management system 21 allows a user, such as a service provider, to define classes of service to be offered to customers and also to define SLAs. As well as this the service management system 21 manages information about services, including information about service level agreements and classes of service. The service management system 21 provides this information in forms adapted for use by a service provider for particular tasks such as performance monitoring, billing and network configuration. The service management system manages the information about service level agreements and classes of service using a model or representation of this information. The carrier service model 54 of FIG. 5 is an example of at least part of such a model. FIG. 16 is an example of such a model or representation for service level agreement information using Unified Modelling Language (UML) notation (also known as class diagram notation, or information model notation) as is known in the art. Similarly, FIG. 18 shows the same type of model for class of service information. FIGS. 17, 19, 20 and 21 also use unified modelling language notation. These models or representations are implemented using any suitable programming language and executed on an information processor such as the management server of FIG. 2.

In FIGS. 16 to 21 each rectangular box represents a schema, class or other class for representing information. The term "class" will be used herein to refer to the programming constructs represented by these rectangles. These classes are implemented as Java objects (trade mark) or other suitable programming constructs. For example, box 200 in FIG. 16 is a contract class and is used to represent information related to particular service level agreements or contracts. Using this contract class format information about many different service level agreements is stored, each group of information about one service level agreement being associated with one such contact class instance.

The arrows between the rectangular boxes indicate relationships between the classes. For example, contract class 200 in FIG. 16 has an arrow to an authoriser class 201 which represents information related to authorisers of a contract or service level agreement. The arrow between the contract class 200 and the authoriser class 201 indicates that each contract class 200 is linked to, or has an authoriser class 201. An integer value may be associated with an arrow in FIGS. 16 to 21. For example, in FIG. 16 the contract class 200 is linked by arrow 202 to authoriser class 201. Associated with this arrow is an integer 1 which indicates that each contract class 200 must have one authoriser class instance 201 for storing operator-authoriser details. An operator-authoriser, authoriser class 201 however, need not have an associated contact class 200 because there is no 1 integer at the end of arrow 202 near the contract class 200.

The contract class 200 is also linked to authoriser class 201 via arrow 203 which is labelled customer-authoriser. This arrow has a 1 integer at both ends, indicating that the contract class must have one customer-authoriser class 201 and each customer-authoriser class 201 must have one contract class 200.

In FIG. 18 a service template class 219 is linked by arrow 321 to a service violation rule class 312. This arrow 321 has an integer 1 and also a "*" sign which indicates that each service violation rule class is associated with one or more service template classes and that each service template class has one service violation rule. The service template class 219 is also linked by arrow 322 to a service type class 306. Next to this arrow 322 a "0 . . . *" sign is given and also a 1 integer. This indicates that each service template class has one service type class and each service type class may be associated with zero or more service template classes.

The class diagrams of FIGS. 16 to 21 thus show types of class for storing information and the relationships between these. A type of "tree class" is thus formed with some of the classes such as the contract class 200 being root classes and others located at the "leaves" of the tree class being termed "base types". For example, these base types may be strings, Boolean values or integer values. The authoriser class 201 of FIG. 16 is linked to two base types 210, 211 which are both strings.

In the particular example shown in FIG. 16, a contract class 200 contains or is linked to the following classes:—

A string for storing a customer name 208
A string for storing a customer description 208
An integer for storing an entity number 209
One or more service classes 207 each for storing information about a service provided under the service level agreement
One or more contact classes 206 for storing contact data
one authoriser operator-authoriser class 201
one authoriser, customer-authoriser class 201
one version class 204 for storing version control data
zero or more log item classes 216 for storing information about changes made to the SLA by users of the system Similarly, each authoriser class 201 has or is linked to a date 210 base type, a string 211 base type (in which information about the name and role of the authoriser is stored), and an authorisation state class 212. The date base type is used to store information about the date when a particular service level agreement was authorised. The authorisation state class 212 contains information indicating whether authorisation has been given or not for a particular service level agreement and this state 212 is associated with the string base type 211.

The version class 204 is associated with a string 213 which is used to store a reference for a particular version of a service level agreement. The version class 204 is also associated with a date 214 and a version state 215. The date 214 stores information about when a service level agreement was first created and last updated. The version state 215 is associated in turn with a string 217 which is used to store information about a version name for a particular version of a service level agreement. The log item class 216 is also associated with this string 217 to identify the version against which a change was made.

The contact class 206 is associated with a string 218 which is arranged to store information about the name, role, telephone number, email address and fax number of a contact person for a particular service level agreement.

Each service level agreement is in respect of one or more particular services and this is represented using an association between the contract 200 and one or more service 207 classes. Also, each service, is of a particular class (such as premium rate or best effort) and this is represented using an association between the service class 207 and a class of service class 220.

A class of service, such as premium rate or best effort is typically defined by a service provider and these classes of service offered to customers. Then, when a customer enters into a service level agreement in respect of a particular service of a given class, some of the definitions of that class of service may be tailored for the particular customer's needs. In order to help the service provider to manage the process of setting up service level agreements and of defining classes of service, a service template class 219 is used. Each service class is thus associated with a class of service class 220 which stores a name for the class of service involved, and that class of service class 220 is in turn associated with a service template class 219. That service template class 219 contains default information for a class of service, where the default information can be changed. The service template class 219 itself is linked to other classes to enable information about a particular class of service to be stored and represented. FIG. 18 shows a service template class 219 and its associated classes.

In the example shown in FIG. 16, each service class 207 is associated with a service access point (SAP) class 221 and a report class 223. The service access point class 221 is associated with a string 222 which is used to store details of an ingress and egress point for a virtual leased line provided under the service level agreement concerned.

The report class 223 is associated with an integer 224 which stores a value indicating the time period over which the report is to be based. The report class 223 is also associated with a report type class 225, a report format class 227 and a report interval class 228 and each of these are associated with a string 226.

The report class 223 is also associated with the contact class 206 in order that reports for a particular service level agreement are linked to a particular contact person to whom the reports are to be sent. A particular instance of a report class 223 may be associated with zero or more instances of the contact class 206.

FIG. 18 shows an example of a representation of information about different service classes or types (for example, premium rate and best effort). This representation is advantageous because it allows new service classes to be easily defined and enables the information to be provided in useable forms for service management.

The service template class 219 of FIG. 16 is shown again in FIG. 18 and its association with various other classes related to service types (such as premium rate) is illustrated. Associated with the service template class 219 is a string 300 which stores a name for a service, such as "voice over IP gold" (VoIP Gold) and a description of this type of service. Also associated with the service template class 219 is a date 301 which stores dates between which the service applies.

The other classes that are directly associated with the service template class 219 comprise a scope class 303, a service type class 306, a metric target class 307 and a service violation rule class 312. Instances of the scope class 303 are used to store information about the scope defined for a particular service. For example, this information is stored in the form of an integer 302 for indicating an upper and a lower call volume, a call volume type field for storing information about the type of calls provided for under the service type, and a string 305 for representing information about the volumes of particular types of call allowed between certain times.

The service template class is also associated with a service type class 306 to store information about the type of service (for example, voice over the internet or TDM services) and a metric target class 307. Instances of the metric target class 307 are used to store information such as quality of service levels guaranteed for particular services. The metric target class 307 is in turn associated with a metric type 308, a number of periods integer 309 and an exclusion class 310. An example of metric types is given in FIG. 12 in the service metric column. For example, service availability and packet latency are examples of metric types. These metrics and their associated values are used to measure the performance of defined services. The number of periods integer 309 defines the period over which its associated metric is measured. The exclusion class 310 is used to represent information about periods of time during which a metric is not to be measured, for example, when routine maintenance is carried out on the communications network supporting the services.

Figure 21:
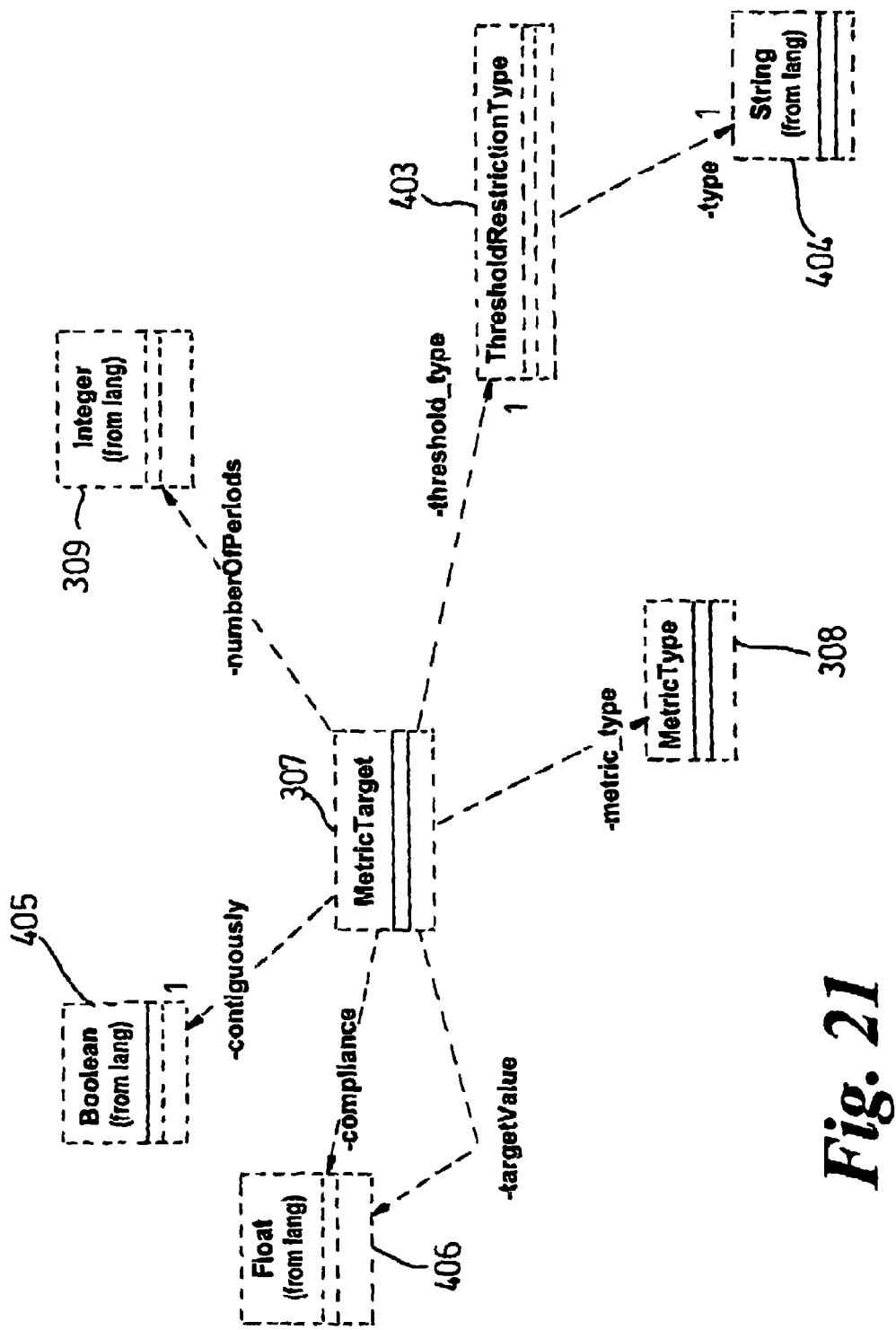
FIG. 21 is an enlarged and more detailed view of another part of the class diagram of FIG. 18.

FIG. 21 shows the metric target class 307 in more detail and shows how it is further associated with a Boolean value 405, a floating point value 406 and a threshold restriction type class 403.

The service template class 219 is also associated with a service violation rule class 312 which provides a means for representing information about what conditions need to be met for violation to occur and in that case what actions are to be taken. Typically this information is specified in service level agreements.

Figure 20:
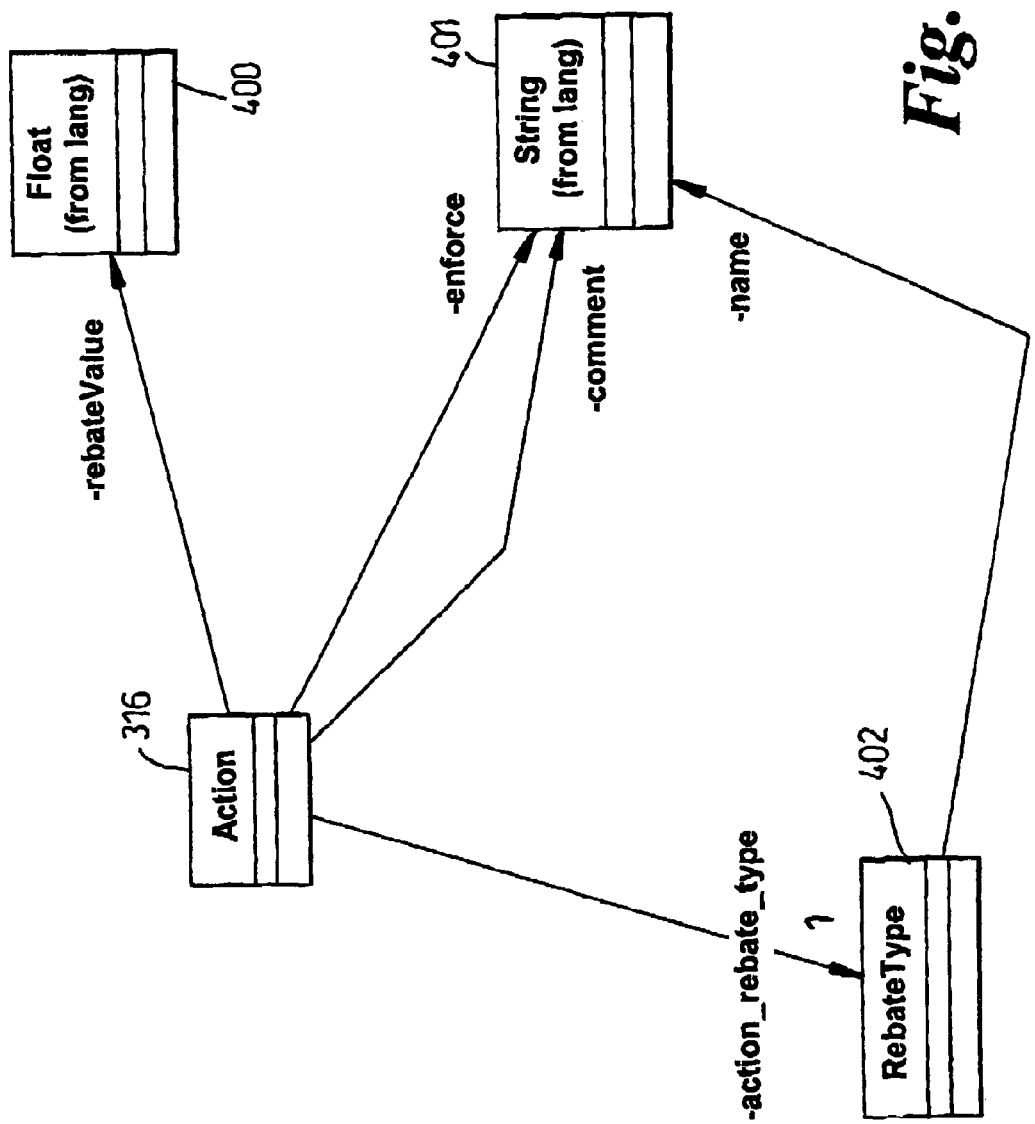
FIG. 20 is an enlarged and more detailed view of part of the class diagram of FIG. 18.

The service violation rule class 312 is associated with the metric target class 307, a string 313, a condition class 315 and an action class 316. More detail of the action class is shown in FIG. 20. For example, for a particular action, a floating point value 400 is given which indicates a rebate value which must be paid by the party violating the agreement. A rebate type class 402 is also associated with the action class 316 in order to capture billing and rebating actions associated with a violation and a string 401 is used to store information about the rebate.

The condition class 315 is associated with a string 314 which stores information about whether the condition is dependent on contiguous measurements or not. There is also an association with an integer for storing information about whether the condition is dependent on a certain number of times that the service level agreement is violated, whether the action should be limited to one action per violation or whether the action should be enforced for the duration of the time that the service level agreement is violated.

In addition, the condition class 315 is associated with a condition duration type class 318 and a condition action limitation type class 319. The function of these classes is to store information to define and constrain the situations under which the service level agreement would be violated.

What is claimed is:

1. A method of provisioning a path between two specified nodes in a connectionless communications network such that the path has a specified bandwidth and a guaranteed quality of service is provided over that path, wherein said communications network supports a differentiated service mechanism, said method comprising the steps of:
   (i) specifying a bandwidth and guaranteed quality of service to be provided over the path;

(ii) accessing a model of said connectionless communications network which is separate from the network;
(iii) determining a path between the two specified nodes using said model;
(iv) assessing the service type of data to be sent over said path;
(v) assessing the amount of available bandwidth over said path using said model; and
(vi) producing provisioning information, taking into account said service type and amount of available bandwidth, to provision said path using said model for output to the network or a network simulator.

2. A method as claimed in claim 1 wherein said step (iii) of assessing the amount of available bandwidth comprises accessing a bandwidth tally for each node in said path.

3. A method as claimed in claim 2 which further comprises accessing a bandwidth tally for each link in said path.

4. A method as claimed in claim 1 which further comprises inputting said provisioning information to said communications network in order to provision said communications network.

5. A method as claimed in claim 1 wherein said path is auto-generated.

6. A method as claimed in claim 4 wherein said path is determined using the shortest path first algorithm.

7. A method as claimed in claim 1 wherein said path is determined using a discovery method.

8. A method as claimed in claim 1 wherein said path is pre-specified by a network operator.

9. A method as claimed in claim 1 which further comprises the step of adding service type labels to traffic.

10. A method as claimed in claim 1 wherein said connectionless communications network is an internet protocol communications network.

11. A method as claimed in claim 1 wherein said path is a virtual leased line.

12. A method as claimed in claim 1 which further comprises the step of inputting information about said path, said specified bandwidth and quality of service, said differentiated service mechanism and said provisioning information to a simulator which is arranged to forecast traffic congestion points in said connectionless communications network.

13. A method as claimed in claim 1 wherein said differentiated service mechanism comprises priority queuing.

14. A method as claimed in claim 1 wherein said differentiated service mechanism comprises allocating traffic to one of two or more service types and one of said two specified nodes is arranged to label traffic according to its allocated service type.

15. A method as claimed in claim 1 wherein said differentiated service mechanism comprises allocating traffic to one of two or more service types and wherein said method further comprises determining the proportion of the bandwidth at a given node or link that is reserved for use by traffic of a given service type.

16. A method as claimed in claim 15 wherein said provisioning information is determined such that said proportion is less than a specified threshold level.

17. A computer system for provisioning a path between two specified nodes in a connectionless communications network such that the path has a specified bandwidth and a guaranteed quality of service, wherein said communications network supports a differentiated service mechanism, said computer system comprising:
(i) a processor arranged to access a model of the connectionless communications network which is separate from the network and to record a specified bandwidth and guaranteed quality of service for the path;
(ii) said processor being arranged to determine a path between the two specified nodes using said model; and wherein said processor is further arranged to assess the service type of the data to be sent across said path and the amount of available bandwidth over said path using said model; and
(iii) wherein said processor is further arranged to use said model to produce provisioning information, taking into account said service type and amount of available bandwidth, to provision said path for output to the network or a network simulator.

18. A computer system as claimed in claim 17 which further comprises a graphical user interface provided on a client computer connected to said computer system.

19. A computer system as claimed in claim 18 wherein said graphical user interface is web-based.

20. A computer system as claimed in claim 17 wherein said processor is further arranged to access a bandwidth tally for each node in said path.

21. A computer system as claimed in claim 17 wherein said processor is arranged to determine said path using auto-generation.

22. A computer system as claimed in claim 17 wherein said connectionless communications network is an internet protocol communications network.

23. A computer system as claimed in claim 17 wherein said path is a virtual leased line.

24. A computer system as claimed in claim 17 which further comprises a simulator arranged to accept information about said path, said specified bandwidth and quality of service, said differentiated service mechanism and said provisioning information and wherein said simulator is arranged to forecast traffic congestion points in said connectionless communications network.

25. A computer system as claimed in claim 17 wherein said differentiated service mechanism comprises priority queuing.

26. A computer program stored on a computer readable medium, said computer program being arranged to control a computer system for provisioning a path between two specified nodes in a connectionless communications network such that the path has a specified bandwidth and a guaranteed quality of service is provided over that path, wherein said communications network supports a differentiated service mechanism, said computer program being arranged to control said computer system such that:
(i) a model of the connectionless communications network is accessed which is separate from the network;
(ii) a path between the two specified nodes is determined using said model;
(iii) the service type of data to be sent over said path is assessed;
(iv) the amount of available bandwidth over said path is assessed using said model; and
(v) provisioning information taking into account said service type and amount of available bandwidth, for output to the network or a network simulator to provision said path is produced using said model.

27. A connectionless communications network comprising a computer system as claimed in claim 17.

* * * * *